United States Patent
Lee et al.

(10) Patent No.: US 11,184,922 B2
(45) Date of Patent: Nov. 23, 2021

(54) METHOD AND APPARATUS FOR TRANSMITTING UPLINK DATA ON BASIS OF CONTENTION IN WIRELESS COMMUNICATION SYSTEM

(71) Applicant: LG Electronics Inc., Seoul (KR)

(72) Inventors: Hojae Lee, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 16/614,569

(22) PCT Filed: May 15, 2018

(86) PCT No.: PCT/KR2018/005531
§ 371 (c)(1),
(2) Date: Nov. 18, 2019

(87) PCT Pub. No.: WO2018/212543
PCT Pub. Date: Nov. 22, 2018

(65) Prior Publication Data
US 2020/0187248 A1     Jun. 11, 2020

Related U.S. Application Data

(60) Provisional application No. 62/507,809, filed on May 18, 2017.

(51) Int. Cl.
*H04W 74/08* (2009.01)
*H04W 74/00* (2009.01)
(Continued)

(52) U.S. Cl.
CPC ............ *H04W 74/08* (2013.01); *H04B 1/713* (2013.01); *H04W 72/04* (2013.01); *H04W 74/004* (2013.01); *H04W 74/04* (2013.01)

(58) Field of Classification Search
CPC ..... H04W 74/08; H04W 48/08; H04W 74/04; H04W 74/002; H04W 74/004
See application file for complete search history.

(56) References Cited

U.S. PATENT DOCUMENTS

2009/0213815 A1* 8/2009 Sherman ........... H04W 74/0841
370/336
2009/0310620 A1* 12/2009 Yoshizawa ............ H04L 12/413
370/461
(Continued)

FOREIGN PATENT DOCUMENTS

JP     2007525926     9/2007
JP     2016529805     9/2016
(Continued)

OTHER PUBLICATIONS

Japanese Office Action in Japanese Appln. No. 2019-563459, dated Sep. 8, 2020, 6 pages (with English translation).
(Continued)

*Primary Examiner* — Raj Jain
(74) *Attorney, Agent, or Firm* — Fish & Richardson P.C.

(57) ABSTRACT

Provided are a method and an apparatus for transmitting uplink data on the basis of contention in a wireless communication system. Specifically, a terminal receives, from a base station, allocation information for a contention zone in one resource zone. The allocation information includes a configuration field indicating locations and the number of contention zones. The terminal determines whether repetition of uplink data is to be performed, on the basis of downlink channel information. When it is determined that the repetition of uplink data is to be performed, the terminal transmits, to the base station, uplink data through all contention zones indicated by the configuration field. When it is determined that the repetition of uplink data is not to be performed, the terminal transmits, to the base station, uplink
(Continued)

data through one contention zone arbitrarily selected from among all the contention zones indicated by the configuration field.

12 Claims, 20 Drawing Sheets

(51) Int. Cl.
    *H04W 74/04*     (2009.01)
    *H04B 1/713*     (2011.01)
    *H04W 72/04*     (2009.01)

(56) References Cited

U.S. PATENT DOCUMENTS

| | | | |
|---|---|---|---|
| 2012/0044878 A1* | 2/2012 | Ratasuk | H04W 74/0866 370/329 |
| 2013/0028219 A1 | 1/2013 | Lee et al. | |
| 2016/0128102 A1 | 5/2016 | Jauh et al. | |
| 2016/0183309 A1 | 6/2016 | Zhang et al. | |
| 2017/0019930 A1 | 1/2017 | Lee et al. | |
| 2018/0302868 A1* | 10/2018 | Bhorkar | H04W 56/0005 |
| 2019/0141750 A1* | 5/2019 | Lee | H04W 74/0816 |
| 2020/0187248 A1* | 6/2020 | Lee | H04W 72/12 |

FOREIGN PATENT DOCUMENTS

| | | |
|---|---|---|
| KR | 20090098722 | 9/2009 |
| KR | 1020110083535 | 7/2011 |
| KR | 20110117012 | 10/2011 |
| KR | 20170017010 | 2/2017 |
| WO | WO15017983 | 2/2015 |

OTHER PUBLICATIONS

Korean Office Action in Korean Appln. No. 10-2019-7032523, dated Sep. 21, 2020, 10 pages (with English translation).
LG Electronics, "Data transmission during random access procedure in MTC," R1-1707570, 3GPP TSG RAN WG1 Meeting #89, Hangzhou, P.R. China, May 15-19, 2017, 5 pages.
LG Electronics, "Discussion on early termination of uplink repetitions for MTC," R1-1707569, 3GPP TSG RAN WG1 Meeting #89, Hangzhou, P.R. China, May 15-19, 2017, 4 pages.
Extended European Search Report in European Appln. No. 18802690.0, dated Feb. 26, 2020, 9 pages.

* cited by examiner

METHOD AND APPARATUS FOR TRANSMITTING UPLINK DATA ON BASIS OF CONTENTION IN WIRELESS COMMUNICATION SYSTEM

CROSS-REFERENCE TO RELATED APPLICATIONS

This application is a National Stage application under 35 U.S.C. § 371 of International Application No. PCT/KR2018/005531, filed on May 15, 2018, which claims the benefit of U.S. Provisional Application No. 62/507,809, filed on May 18, 2017. The disclosures of the prior applications are incorporated by reference in their entirety.

BACKGROUND

Field

The present specification relates to wireless communication and, more particularly, to a method for transmitting uplink data based on contention in a wireless communication system and an apparatus using the same.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources.

Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A requirement of a next-generation wireless communication system is to accommodate significantly explosive data traffic, to increase a dramatic increase in a transfer rate per user, to accommodate the significantly increased number of connected devices, and to support a very low end-to-end (E2E) latency and high energy efficiency. For this, there is ongoing research on various techniques such as dual connectivity, massive multiple-input multiple-output (MIMO), in-band full duplex, non-orthogonal multiple access (NOMA), super wideband support, device networking, or the like.

SUMMARY

The present specification provides a method and an apparatus for transmitting uplink data based on contention in a wireless communication system.

The present specification proposes a method and an apparatus for transmitting uplink data based on contention in a wireless communication system.

The apparatus includes a radio frequency (RF) unit to transmit and receive a radio signal and a processor connected to the RF unit.

This embodiment illustrates grant-free uplink communication between a base station and a particular UE in a wireless communication system to which an orthogonal or non-orthogonal multiple access scheme is applied. In grant-free uplink data transmission, since an uplink grant (UL grant) for data transmission is not received, the UE may select a resource for data transmission from among contention resources to perform data transmission.

First, terms used herein are defined. A contention zone may correspond to a resource region for contention-based uplink connection or uplink data transmission based on orthogonal or non-orthogonal multiple access. That is, a contention zone may correspond to a minimum-unit physical resource region in which contention-based transmission is performed. In contrast, a resource zone is a physical resource region in which scheduling-based transmission and contention-based transmission are performed and may correspond to a resource region using all or part of bandwidth within a specific period.

A UE receives allocation information on a contention zone in one resource zone from a base station. The allocation information includes a configuration field including information on the location of a contention zone and the number of contention zones.

When the contention zone is indicated by the configuration field, the configuration field may be configured as follows.

For example, the configuration field may include a density index, a time offset index, a frequency offset index, and a frequency hopping index. The density index may include information on the number of contention zones allocated in the one resource zone and a period between the contention zones allocated in the one resource zone. The time offset index may include information o a position at which the contention zone allocated in the one resource zone is time-offset from a reference subframe. The frequency offset index may include information o a position at which the contention zone allocated in the one resource zone is frequency-offset from a reference resource block. The frequency hopping index may include information o a frequency hopping interval between the contention zones allocated in the one resource zone.

When the contention zone is indicated by a pattern index for a predefined allocation pattern, the configuration field may not be used. That is, the allocation information may further include a pattern index including information on a predefined allocation pattern of the contention zone in the one resource zone. The predefined allocation pattern may be defined in the format of a lookup table. This format has a disadvantage of imposing heavy loads on a memory because all predefined allocation patterns need to be stored in the memory, but has an advantage of enabling quick performance processing because it is not necessary to perform calculation due to a value included in the configuration field.

The allocation information may be received through radio resource control (RRC) signaling or an upper-layer signal.

The contention zone in the one resource zone may be periodically allocated based on a period T. The period T may be broadcast through system information broadcasting (SIB).

The maximum number of subframes in which the contention zone in the one resource is allocated and the maximum number of resource blocks in which the contention zone in the one resource is allocated may be received through RRC signaling or an upper-layer signal or may be broadcasted through SIB.

The number of bits of the configuration field may be determined according to the maximum number of subframes in which the contention zone in the one resource is allocated and the maximum number of resource blocks in which the contention zone in the one resource is allocated. For example, when the maximum number of subframes is eight and the maximum number of resource blocks is four, there may be 32 contention zones in one resource. Accordingly, a combination of contention zones in one resource may be indicated by a configuration field of seven bits (2^7).

The UE may determine whether to repeat uplink data based on downlink channel information. The UE may measure a signal-to-noise ratio (SNR) through the downlink channel information.

When the UE is located at the cell edge or is a low-cost massive machine-type communication (MMTC) UE, it is necessary to repeatedly use small power due to a small power amp. Accordingly, the UE may determine whether to repeat the uplink data based on whether the SNR measured through the downlink channel information exceeds a specified threshold value.

When it is determined to repeat the uplink data, the UE transmits the uplink data to the base station through all contention zones indicated by the configuration field.

When it is determined not to repeat the uplink data, the UE transmits the uplink data to the base station through one contention zone randomly selected from among all contention zones indicated by the configuration field.

Unlike retransmission of uplink data, repetition of uplink data may be a method of performing one transmission through all contention zones indicated by the configuration field. Therefore, repetition of uplink data corresponds to one transmission through a plurality of contention zones regardless of whether transmission of uplink data fails. When the base station transmits a response signal including information on that transmission of uplink data has failed and thus the UE performs second transmission, the second transmission may be retransmission of the uplink data.

The UE may consider link adaptation for contention-based transmission.

The UE may select a UE class based on the downlink channel information.

The UE may determine a modulation and coding scheme (MCS) level candidate that is available based on the UE class.

In this case, the UE class may be associated with the MCS level candidate based on the measured SNR. The UE class may correspond to a UE group considering a location in a cell. Therefore, a UE group located at the cell edge has a low SNR and may thus use a low MCS level, while a UE group located at the cell center has a high SNR and may thus use various MCS levels. The UE may select an appropriate MCS level from among maximum MCS levels in consideration of generated traffic.

The configuration field may further indicate the location of a contention zone and the number of contention zones for each MCS level included in the MCS level candidate. When the uplink data is repeated, the uplink data may be transmitted through a contention zone for a minimum MCS level among all the contention zones indicated by the configuration field.

According to the proposed scheme, when a UE is located at the cell edge or is a low-cost MMTC UE and thus has insufficient power amp, the UE may be allocated all contention zones in order to repeatedly perform uplink transmission, or may be allocated a contention zone associated with an MCS level by selecting the MCS level in view of the traffic of the UE. Accordingly, it is possible to achieve gains in SNR or to improve reliability in data transmission.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present specification are not limited thereto.

Figure 1:
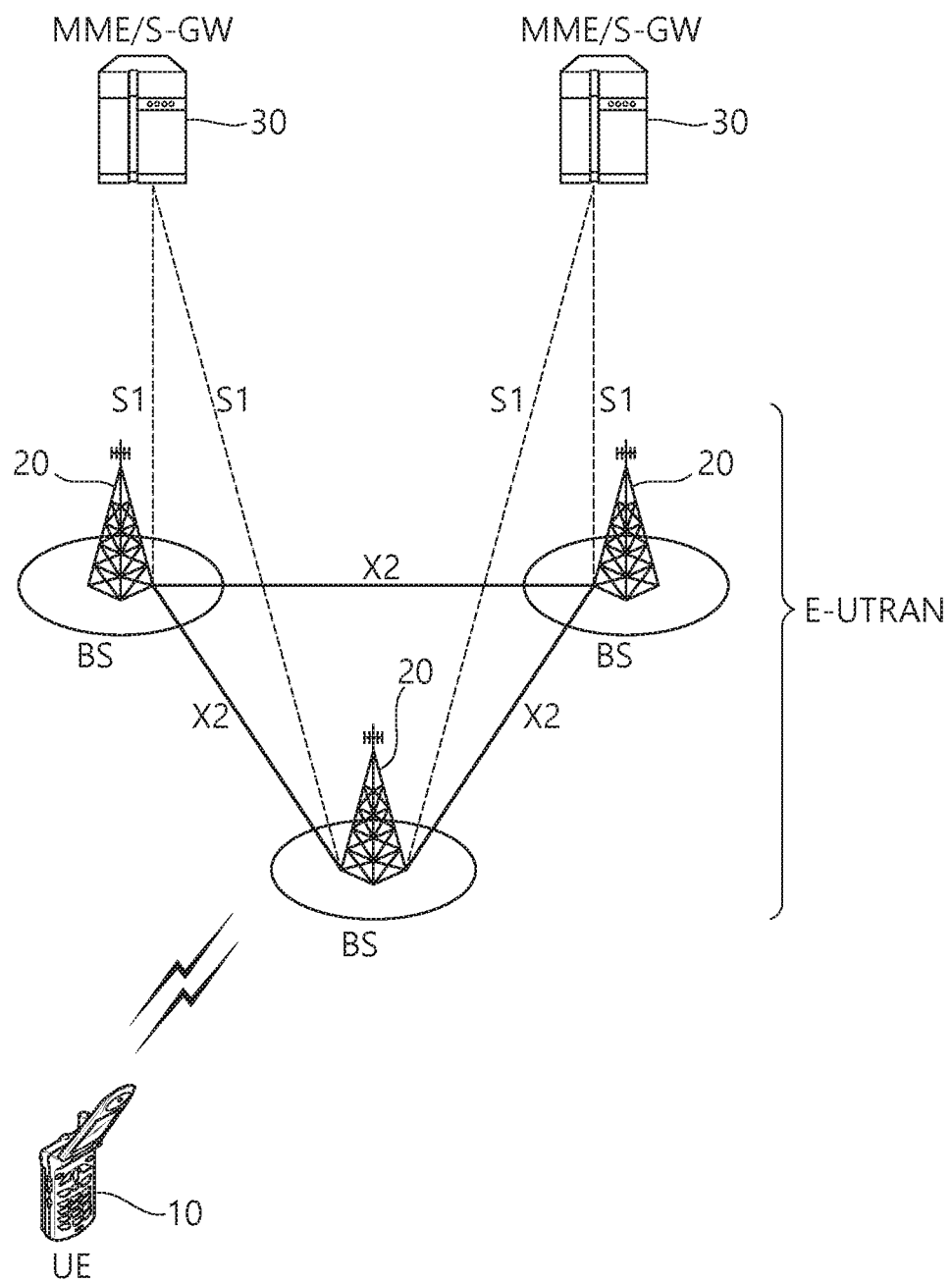
FIG. 1 shows a wireless communication system to which the present specification is applied.

FIG. 1 shows a wireless communication system to which the present specification is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
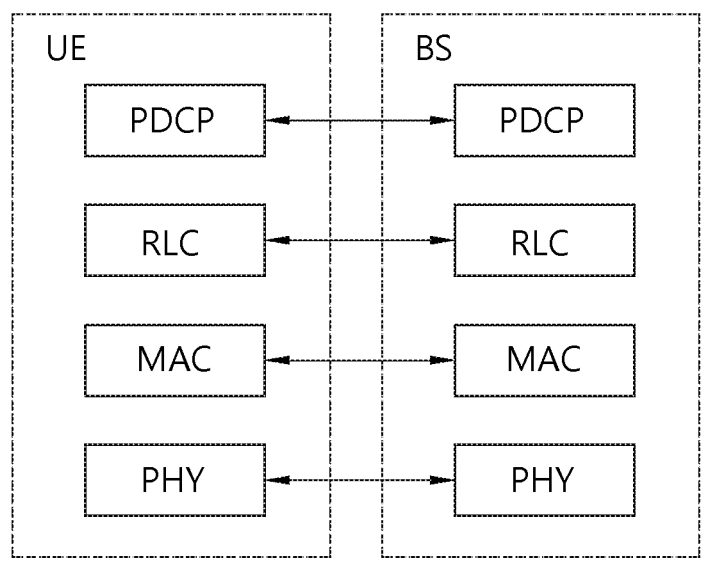
FIG. 2 is a diagram illustrating a radio protocol architecture for a user plane.
Figure 3:
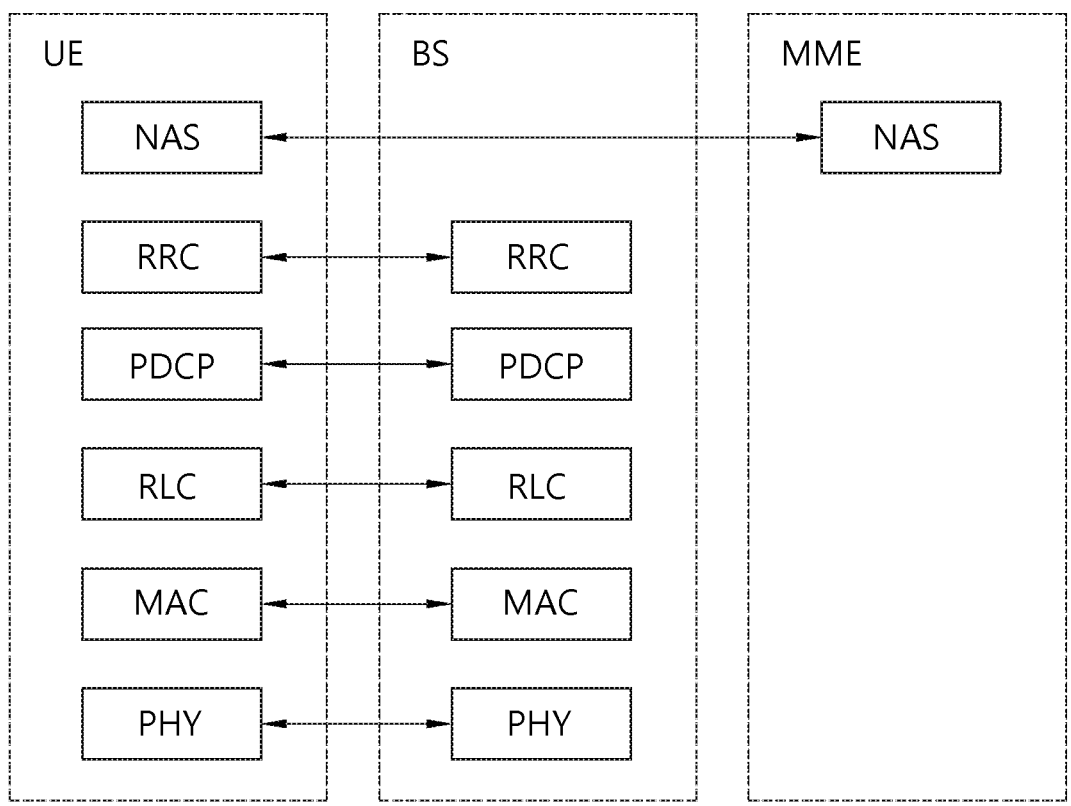
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
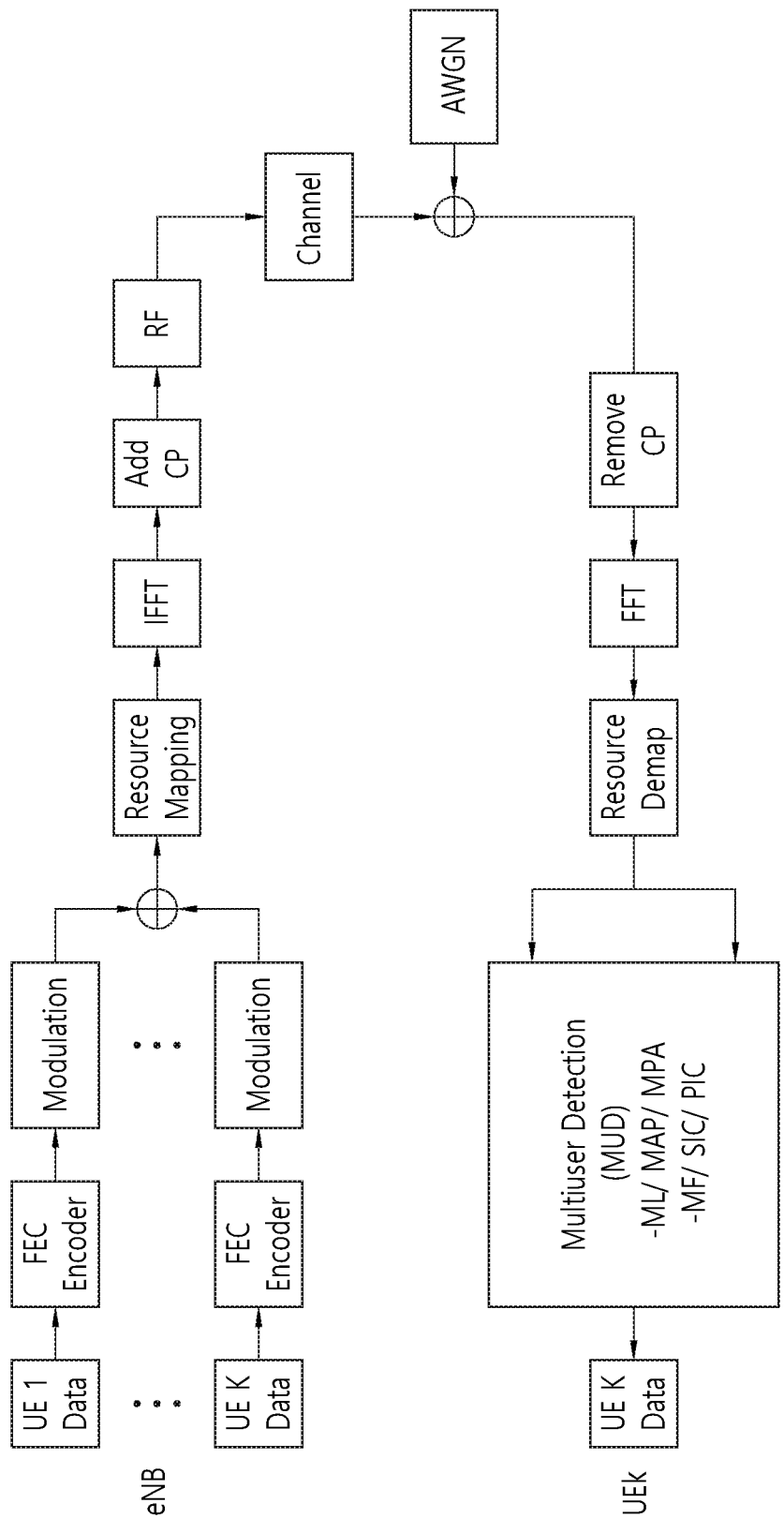
FIG. 4 is a block diagram illustrating NOMA based downlink transmission/reception (Tx/Rx) of a communication apparatus.

FIG. 4 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 4 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 4 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 4 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 4 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 5:
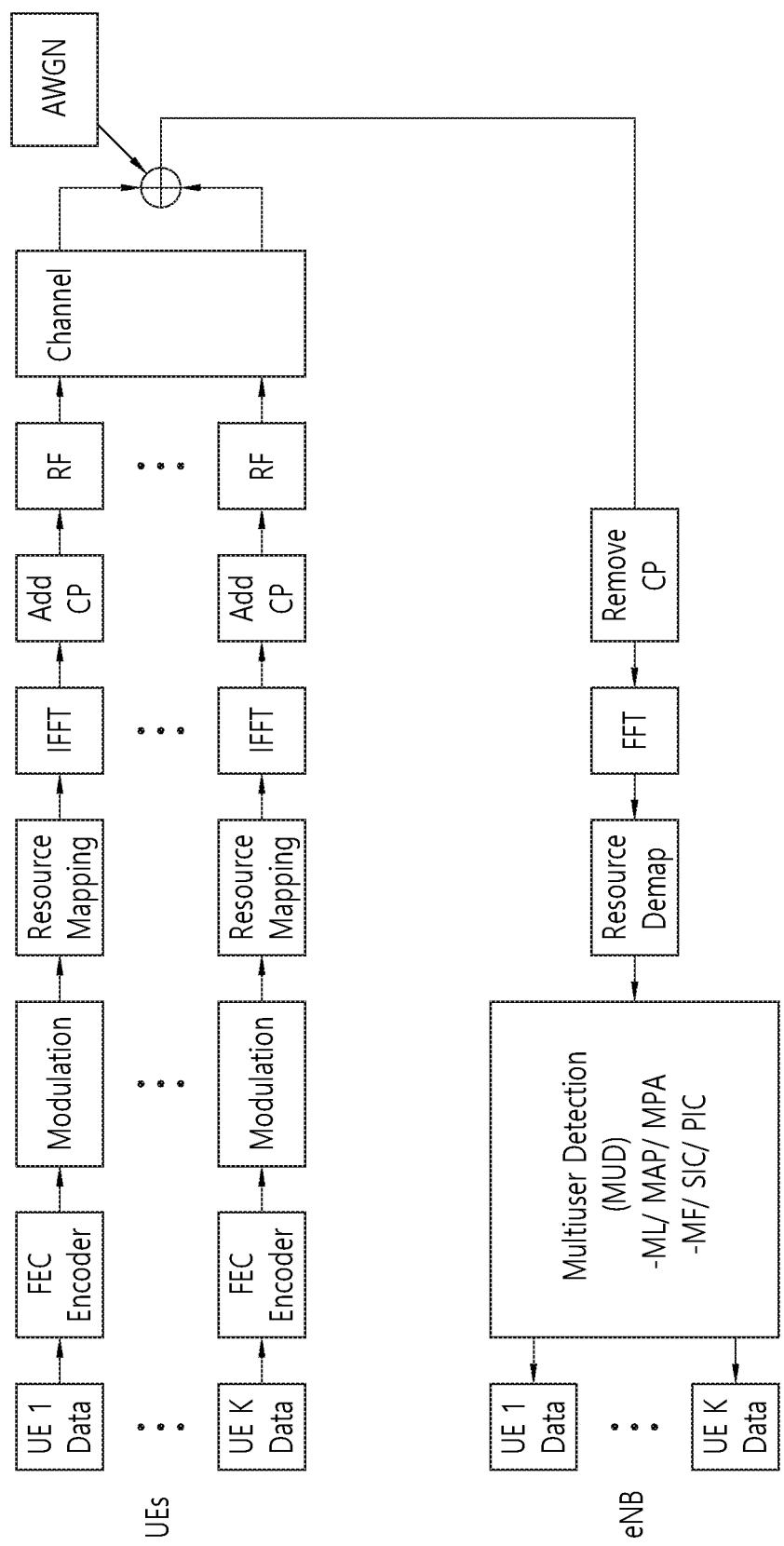
FIG. 5 is a block diagram illustrating NOMA based uplink transmission/reception (Tx/Rx) of a communication apparatus.

FIG. 5 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 5. Each system may transmit multi-UE data in the same manner as the description of the downlink structure of FIG. 4 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 4 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{\left|\sum_{n \neq k, n=1}^{K} h_k s_n\right|^2 + \sigma_k}\right) =$$

$$\log_2\left(1 + \frac{\text{Channel Gain}}{MUI + \text{Noise}}\right), \forall k$$

In transmission capacity of the above Equation 2, the number of Rk added in accordance with increase of K may be increased, whereby increase of C may be expected. However, each Rk may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE. Therefore, the development of multi-UE access technology that may control MUI according to data superposition transmission of the multi-UE is required. The development of multi-UE access technology that may control MUI generated during data superposition transmission of the multi-UE to the same time-frequency resource is required.

Therefore, the present specification suggests a non-orthogonal coded multiple access (NCMA) that minimizes multi-UE interference of the next generation 5G system.

Figure 6:
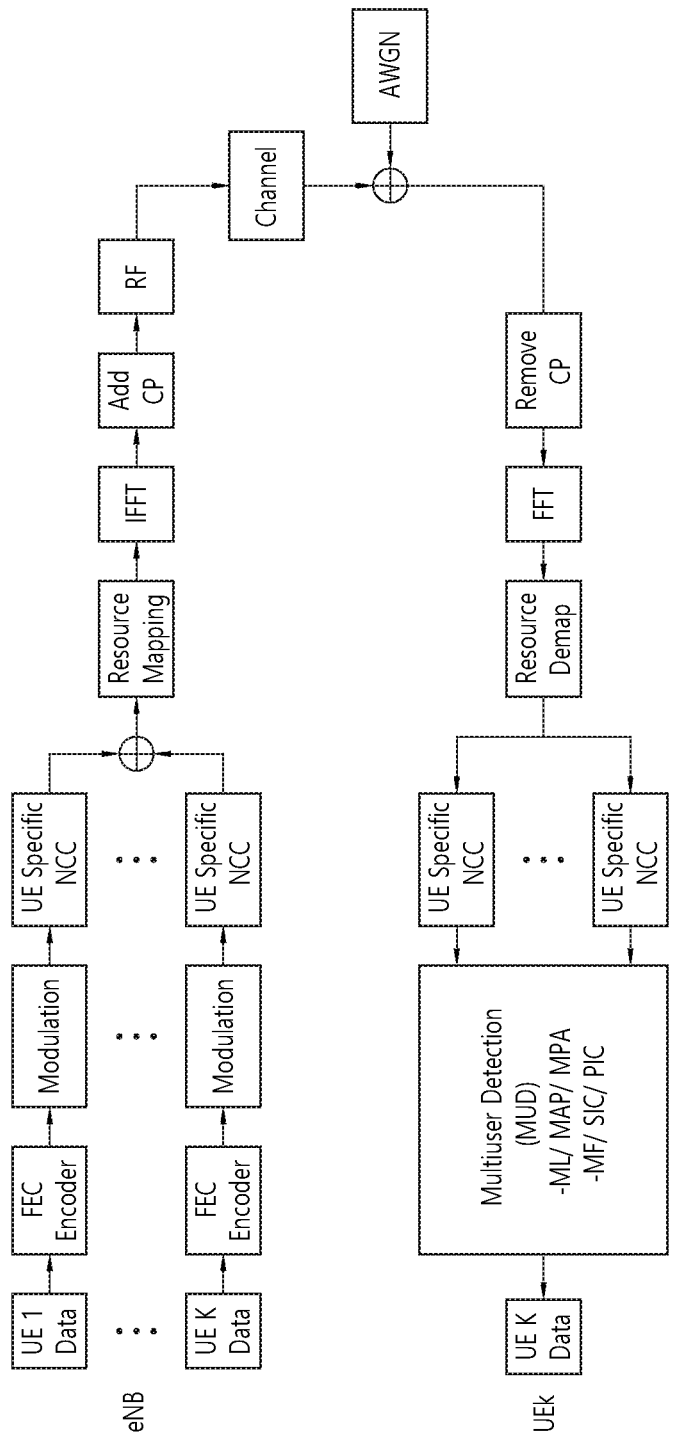
FIG. 6 is a block diagram illustrating NCMA based downlink transmission/reception (Tx/Rx) of a communication apparatus.
Figure 7:
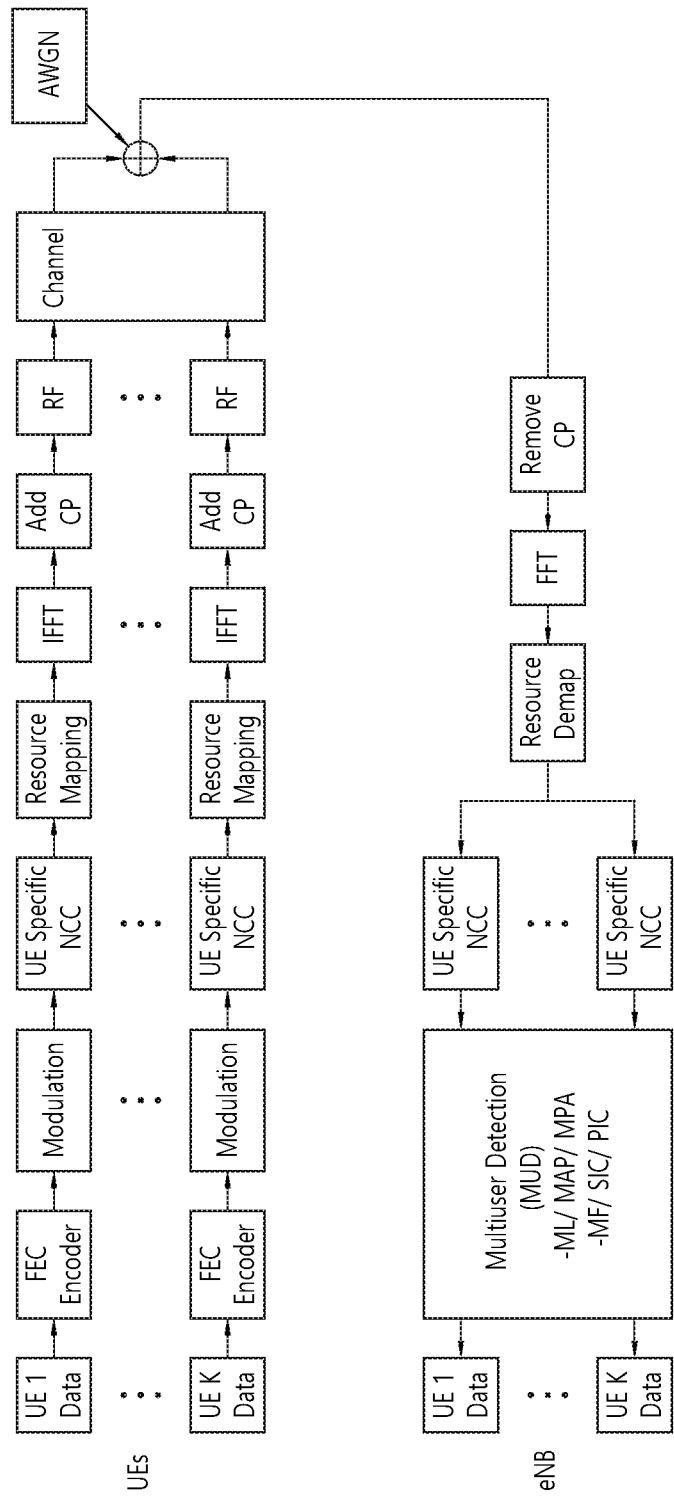
FIG. 7 is a block diagram illustrating NCMA based uplink transmission/reception (Tx/Rx) of a communication apparatus.

FIG. 6 is a block diagram illustrating NCMA based downlink transmission/reception (Tx/Rx) of a communication apparatus, and FIG. 7 is a block diagram illustrating NCMA based uplink transmission/reception (Tx/Rx) of a communication apparatus.

The present specification suggests an NCMA scheme that minimizes multi-UE interference when data of multi-UE are transmitted to the same time-frequency resource through superposition. FIGS. 6 and 7 illustrate downlink and uplink transmitter and receiver structures of the NCMA system that performs superposition transmission by using UE specific non-orthogonal code cover (NCC) when multi-UE information is allocated to the same time-frequency resource. The transmitter/receiver (or transmitting side/receiving side) allocates UE-specific NCC to each UE by using a non-orthogonal codebook which is previously defined.

The codeword mentioned in the present specification means a complex element vector selected by (or allocated to) each UE to perform non-orthogonal multiple access. The codebook means a set of codewords used by each UE to perform non-orthogonal multiple access. The codebook mentioned as above may exist as a plurality of codebooks. The UE-specific NCC means that the complex element vector of the codebook selected by (or allocated to) each UE is used for a symbol to be transmitted. Therefore, the NCC (or UE-specific NCC) may be expressed as codebook index and codeword index. The non-orthogonal codebook is expressed as illustrated in the following Equation 3.

$$C = [c^{(1)} \ldots c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 3]}$$

In the above Equation 3, $c^{(j)}$ is a codeword for the jth UE, and a codeword set for a total of K UEs becomes a codebook C. Use of $c^{(j)}$ for data transmission of the jth UE is defined as NCC. Also, the codebook may be expressed as a vector length N of the codeword and the number K of codewords. In this case, N means a spreading factor, and K means a superposition factor. For convenience of description, although one codeword is used for one UE, a plurality of codewords may be used by one UE or one codeword may be used by a plurality of UEs. Also, one or more codewords allocated to one UE may be subjected to hopping of codewords by use of different codewords in the same codebook or use of different codewords in different codebooks in accordance with time or usage frequency.

UE-specific NCC may be allocated by connection with UE ID in RRC connection process, or may be allocated through DCI (downlink control information) format included in a downlink control channel (for example, PDCCH).

In case of an uplink environment used for contention-based multiple access (MA), a UE may select non-orthogonal codewords randomly or through connection with UE ID. At this time, UE-specific NCC is not allocated by a base station but directly selected by a UE, whereby NCC contention between multiple UEs may occur. A success rate for identification of multi-UE information is reduced due to MUD if there is contention of NCC in the base station which is a receiver.

The UE-specific NCC may be defined by Grassmannian line packing, and a chordal distance formed by two random vectors in the same subspace is always maintained equally. That is, the chordal distance may be obtained mathematically or algorithmically as a codebook that satisfies $\min_C (\max_{1 \leq k < j \leq K} \sqrt{1-|c^{(k)*} \cdot c^{(j)}|^2}), C \subset \mathbb{C}^{N \times K}$. The UE-specific NCC has features as expressed by the following Equation 4.

$$\begin{cases} |c^{(k)*} \cdot c^{(k)}| = 1, \forall k, k = 1, \ldots, K, \\ \text{if } N > K, |c^{(k)*} \cdot c^{(j)}| = \delta, \forall k, \forall j, k = 1, \ldots, K, j = 1, \ldots, K, \\ \text{if } N \leq K, |c^{(k)*} \cdot c^{(j)}| = 0, \forall k, \forall j, k = 1, \ldots, K, j = 1, \ldots, K. \end{cases} \quad \text{[Equation 4]}$$

In this case, $c^{(k)*}$ is a conjugate codeword of c(k). The features of the Equation 4 are as listed in the followings (1), (2), and (3).

(1) Multiplication of the same codewords in the transmitter and the receiver is 1.

(2) The chordal distance between a codeword and another codeword in the same codebook is equally maintained.

(3) If N≤K, a codeword is orthogonal to another codeword.

The codebook having the above features is previously scheduled by the transmitter/receiver (or transmitting side/receiving side) to configure UE-specific NCC. In this case, a lower bound of a chordal distance $$\delta_{N,K} \geq \sqrt{1 - \frac{(N-1)K}{N(K-1)}}$$

according to two random codewords is obtained. Therefore, MUI for superposition transmission of multi-UE data is determined by being minimized by the lower bound. Also, since the chordal distance for the two random codewords is always maintained equally, statistical prediction of MUI may be performed by the number of UEs. If the number of UEs is determined, since a decoding error rate of the receiver may be predicted by MUI value, MCS level may be controlled based on interference for multi-UE superimposition transmission. For example, when K codewords are transmitted in (N×1) dimension, if the receiver performs decoding using its codewords, 1 is decoded from its codeword, and statistical interference of 67 $_{N,K}$(K-1) remains from another K-1 codewords. This value is varied depending on an optimization level of a codebook design. Also, since a difference in a value of $\delta_{N,K}$ exists depending on the optimization level of the codebook design, the number K of superposition UEs or the number N of used resources may be varied depending on Required SINR or target QoS of the communication system, whereby the MUI value may be controlled.

The embodiment of the non-orthogonal codebook is expressed in the form of 3GPP TS 36.211 as listed in that following Tables 1 and 2, and may be used as UE-specific NCC.

Table 1 illustrates a codebook in case of Spreading Factor N=2.

TABLE 1

| # of codewords (Max. # of users: K) | Examples of spreading codebook [c$^{(1)}$ ... c$^{(K)}$] |
|---|---|
| 2 | $\begin{bmatrix} 1 & 1 \\ 1 & -1 \end{bmatrix}$ |
| 3 | $\begin{bmatrix} -0.5078 - 0.2451i & -0.8055 + 0.5684i & -0.1483 - 0.4194i \\ 0.5640 - 0.6034i & 0.1640 + 0.0357i & -0.8751 - 0.1904i \end{bmatrix}$ |
| 4 | $\begin{bmatrix} -0.4907 - 0.7256i & -0.6440 - 0.5906i & -0.1657 + 0.2160i & -0.5775 - 0.2480i \\ 0.4510 + 0.1709i & -0.4552 + 0.1956i & 0.9349 - 0.2279i & -0.3586 - 0.6902i \end{bmatrix}$ |

Table 2 illustrates a codebook in case of Spreading Factor N=4.

TABLE 2

| # of codewords (Max. # of users: K) | Examples of spreading codebook [c$^{(1)}$ ... c$^{(K)}$] |
|---|---|
| 4 | $\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 6 | $\begin{bmatrix} -0.0557 - 0.4476i & -0.1684 - 0.8131i & -0.0149 + 0.2205i & \ldots \\ -0.0198 - 0.1206i & -0.3294 - 0.3689i & -0.0487 + 0.4148i \\ 0.4023 - 0.1460i & -0.4021 + 0.21181i & -0.6703 + 0.0282i & \ldots \\ -0.6521 - 0.4251i & -0.0729 - 0.0903i & -0.2158 - 0.3003i \\ -0.1499 - 0.3961i & 0.0471 - 0.2647i & 0.3131 - 0.5204i & \ldots \\ -0.5576 - 0.0206i & 0.6726 - 0.0552i & 0.0357 + 0.0924i \\ 0.5675 + 0.3346i & -0.0866 + 0.1557i & -0.0287 + 0.3624i & \ldots \\ -0.0286 + 0.2589i & 0.4567 - 0.2792i & 0.6985 + 0.4372i \end{bmatrix}$ |
| 8 | $\begin{bmatrix} -0.2381 - 0.8359i & -0.6599 - 0.1222i & -0.6557 - 0.1776i & -0.1561 + 0.0861i & \ldots \\ & -0.1374 + 0.1275i & -0.1849 + 0.3859i & -0.2426 - 0.2248i & -0.1703 - 0.0604i \\ -0.2593 - 0.3320i & 0.4906 + 0.0221i & 0.3934 + 0.2749i & -0.3453 - 0.2068i & \ldots \\ & -0.5596 + 0.0272i & 0.0616 + 0.0315i & -0.3027 - 0.3133i & -0.7664 + 0.1256i \\ -0.1249 + 0.0320i & 0.425 + 0.3856i & 0.0440 - 0.3295i & -0.3979 + 0.0525i & \ldots \\ & -0.5272 - 0.2195i & 0.0649 - 0.8770i & -0.2452 + 0.4427i & -0.0149 - 0.4727i \\ -0.2180 - 0.0342i & 0.3968 - 0.0250i & -0.3444 - 0.2811i & -0.7817 - 0.1845i & \ldots \\ & 0.2417 + 0.5162i & 0.1956 - 0.0203i & 0.4625 - 0.4805i & 0.0794 - 0.3663i \end{bmatrix}$ |

Various values may be obtained using mathematical equation or algorithm in addition to the above Tables 1 and 2.

Figure 8:
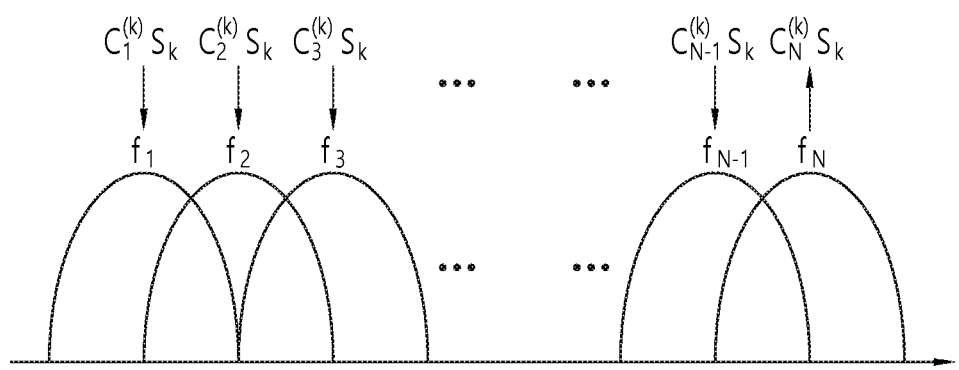
FIG. 8 is a conceptual diagram illustrating a frequency axis of data transmission according to UE-specific NCC.

FIG. 8 is a conceptual diagram illustrating a frequency axis of data transmission according to UE-specific NCC.

FIG. 8 illustrates a concept that a transmitter (or transmitting side) transmits kth UE data on a frequency axis through UE-specific NCC. When UE-specific NCC defined by Grassmaniann line packing is previously scheduled by the transmitter and the receiver, data for the kth UE is multiplied by a codeword corresponding to the kth UE. At this time, one data symbol $s_k$ corresponds to a codeword vector $c^{(k)}$ of (N×1) dimension. Then, N elements of the codeword correspond to N subcarriers.

That is, in FIG. 8, since one data symbol is transmitted to N subcarriers, the same time-frequency resource efficiency is reduced to 1/N as compared with the legacy LTE system. On the other hand, if N or more symbols are transmitted by superposition, time-frequency resource efficiency is increased as compared with the LTE system. For example, if K symbols are transmitted by superposition in case of N<K, frequency resource efficiency is increased as much as K/N times.

Figure 9:
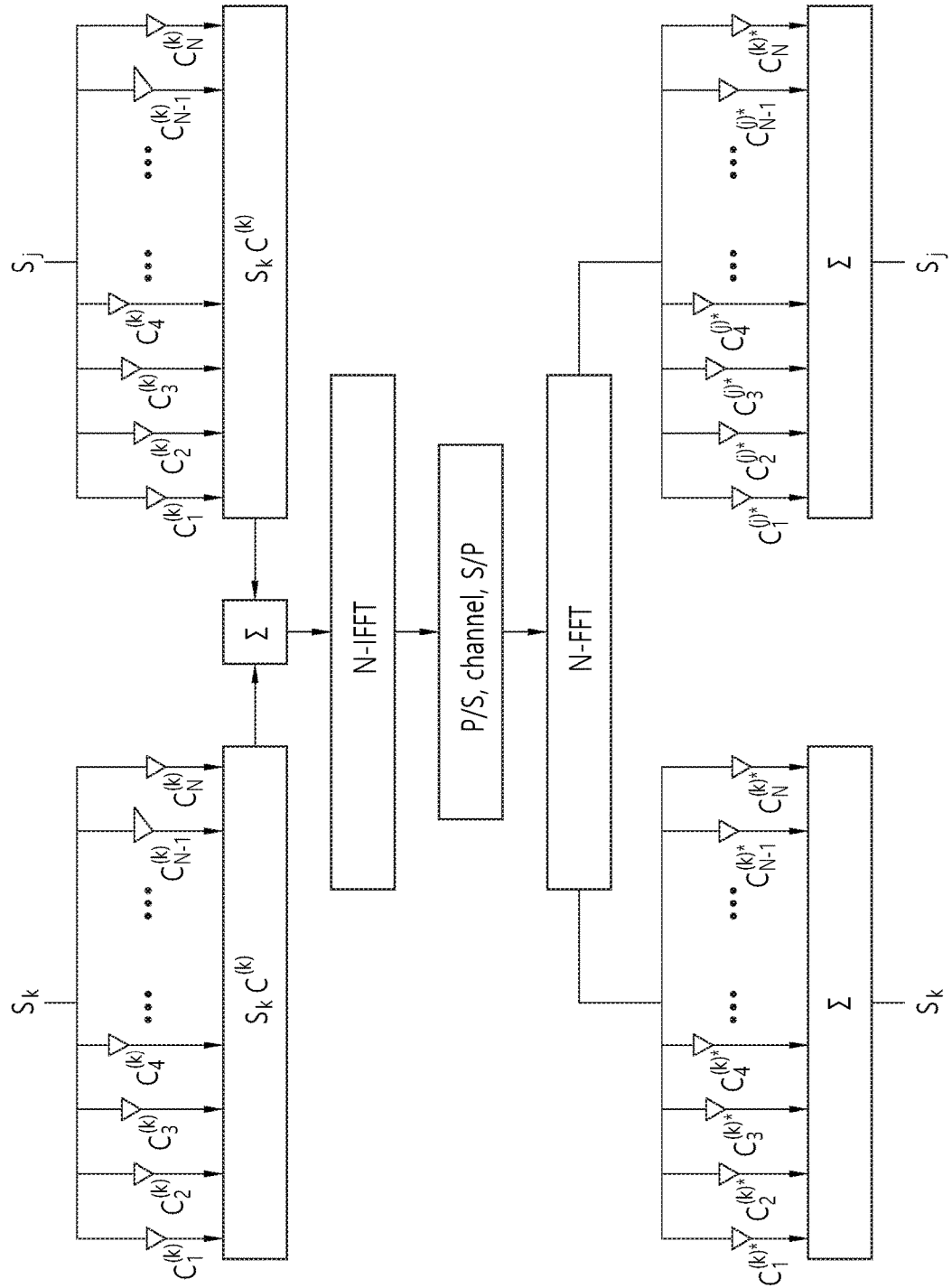
FIG. 9 is a structural diagram illustrating basic transmission and reception of NCMA system.

FIG. 9 is a structural diagram illustrating basic transmission and reception of NCMA system.

FIG. 9 is a basic transmission and reception structural view of NCMA system that uses UE-specific NCC. Data symbols for each UE are converted to UE-specific NCC corresponding to each UE and superposed in the transmitter. A frequency axis signal of a superposed N length is converted to a time-axis signal through N-IFFT, whereby OFDM transmission is performed, and the receiver restores the time-axis signal to a frequency-axis signal through N-FFT. The restored frequency-axis signal decodes each UE data symbol using a conjugate codeword of UE-specific NCC corresponding to each UE. The decoded $s_k$ may include MUI depending on the number of superposed UEs, and exact $s_k$ decoding is available through MUD. At this time, the length of the frequency-axis signal converted in accordance with UE-specific NCC which is previously defined may be shorter than N. For example, if two frequency-axis signal vectors converted to UE-specific NCC of N/2 length are connected in series to form N length, it will be apparent that demodulation is available in the receiver even in case of N-FFT.

In case of downlink, a detection equation for data decoding in the kth UE receiver is expressed as illustrated in the following Equation 5.

$$y_k = \sum_{n=1}^{K} H_k c^{(n)} s_n + n_k,$$

$$\hat{y}_k = \left[\frac{[y_k]_j}{[H_k]_{j,j}}\right]_{j=1,\ldots,N} = \sum_{n=1}^{K} c^{(n)} s_n + \hat{n}_k,$$

[Equation 5]

In the above Equation 5, $H_k$ means (N×N) channel matrix from the kth transmitter to the receiver, and includes frequency-axis channel coefficients as a diagonal matrix. $c^{(k)}$ is (N×1) UE-specific NCC vector for the receiver at the kth transmitter, $s_k$ is a data symbol to the kth receiver, and n means (N×1) signal noise vector. K is the number of multi-UEs allocated to the same time-frequency resource. In this case, $$\left[\frac{[A]_j}{[B]_{j,j}}\right]_{j=1,\ldots,N}$$

means division of the jth element of vector A and the jth diagonal element of matrix B. If the vector A is a diagonal matrix, the vector A means element division of diagonal matrixes.

A signal of desired codewords and noise remain through channel compensation in the above Equation 5, and are detected as expressed by the following Equation 6 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot c^{(n)} s_n + \tilde{n}_k,$$

$$= s_k + \sum_{n \neq k, n=1}^{K} c^{(k)*} \cdot c^{(n)} \cdot s_n + \tilde{n}_k.$$

[Equation 6]

In the above Equation 6, the second item of the last column indicates MUI, and may be removed or reduced through the MUD scheme.

In case of uplink, a detection equation for data decoding in the receiver of the base station is expressed as illustrated in the following Equation 7.

$$y = \sum_{n=1}^{K} H_n c^{(n)} s_n + n = H_k c^{(k)} s_k + \sum_{n \neq k, n=1}^{K} H_n c^{(n)} s_n + n,$$

[Equation 7]

The second term of the third formula of the Equation 7 indicates multi-UE interference signal MUI according to a data symbol to another receiver. A detection equation of the receiver for data decoding of the kth UE is expressed as illustrated in the following Equation 8.

$$\hat{y}_k =$$

$$\left[\frac{[y]_j}{[H_k]_{j,j}}\right]_{j=1,\ldots,N} = c^{(k)} s_k + \sum_{n=1}^{K} \left[\frac{[H_n]_{j,j}}{[H_k]_{j,j}}\right]_{j=1,\ldots,N} c^{(n)} s_n + \hat{n},$$

[Equation 8]

A signal of desired codewords, MUI, and noise remain through channel compensation for the kth UE data, and are detected as expressed by the following Equation 9 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot$$

$$\left[\frac{[H_n]_{j,j}}{[H_k]_{j,j}}\right]_{j=1,\ldots,N} c^{(n)} s_n + \tilde{n},$$

$$= s_k + \sum_{n \neq k, n=1}^{K} c^{(k)*} \cdot \left[\frac{[H_n]_{j,j}}{[H_k]_{j,j}}\right]_{j=1,\ldots,N} c^{(n)} s_n + \tilde{n}.$$

[Equation 9]

In the above Equation 9, the second item of the last column indicates MUI, and may be removed or reduced through the MUD scheme. At this time, frequency-axis channel change of $$\left[\frac{[H_n]_{j,j}}{[H_k]_{j,j}}\right]_{j=1,\ldots,N}$$

causes a change of MUI value when MUD according to UE-specific NCC is performed due to a change of a channel environment from the multi-UE. For convenience of description, a single transmitting and receiving antennas is provided, it will be apparent that the same scheme is applied to even an environment where multiple antennas are used.

According to the description related to the aforementioned NCMA scheme, it is possible to achieve higher frequency usage efficiency or more massive connectivity in accordance with the number of superposed UEs while controlling MUI according to multi-UE data superposition transmission.

The present specification proposes a contention-based multiple access (MA) scheme. The proposed scheme includes an operating scheme based on hierarchical coding and modulation in contention-based multiple access. Hereinafter, the contention-based multiple access scheme will be described.

Figure 10:
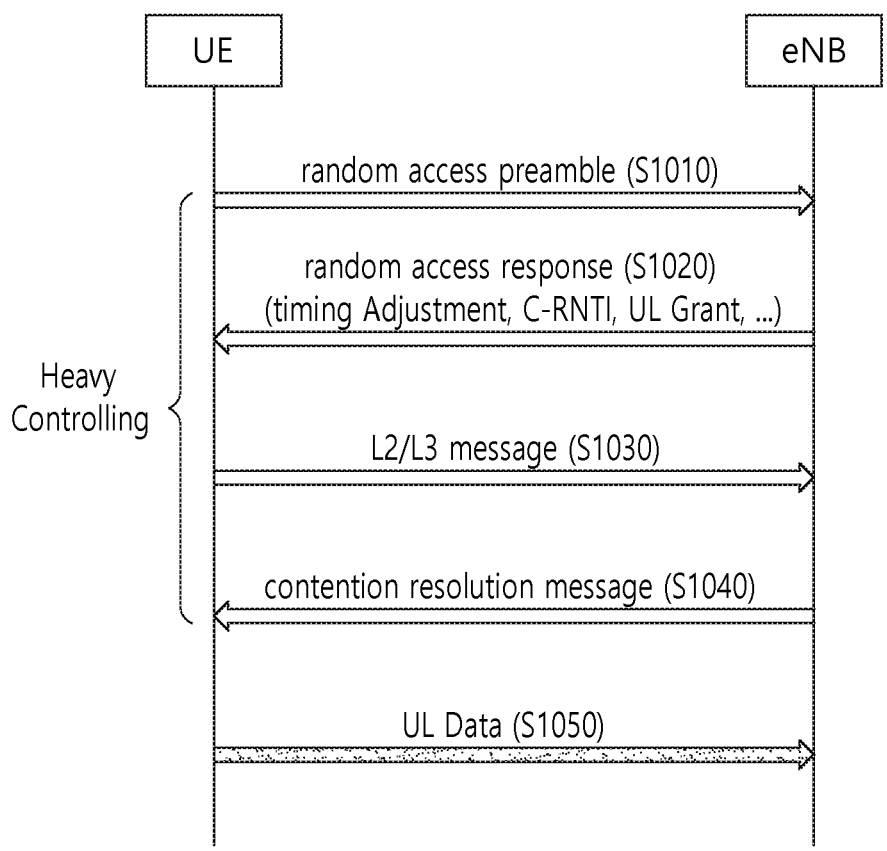
FIG. 10 illustrates a contention-based random access procedure in an LTE system.

FIG. 10 illustrates a contention-based random access procedure in an LTE system.

In a wireless communication system, a contention-based multiple access scheme illustrated FIG. 10 is a general technique. FIG. 10 illustrates an uplink access scheme in an LTE communication system. This access method may also be used for an ad-hoc network, such as device-to-device (D2D) communication or vehicle-to-everything (V2X) communication, and a cellular method, such as LTE-Advanced (LTE-A) or machine-type communication (MTC).

According to the contention-based multiple access scheme, a UE transmits a scheduling request (SR) to a base station (eNB) (S1010) and receives scheduling information from the base station (S1020). The scheduling information received from the base station includes a timing adjustment or timing advance (TA) for synchronization between received signals from multiple users, a cell ID, and a grant for uplink access (e.g., control information including MCS level information or resource allocation information, which is transmitted via a PDCCH). Generally, in a communication system, a plurality of UEs use limited radio resources, but one UE cannot know the state of another UE, and thus a plurality of UEs may request allocation of the same resource at the same time. Accordingly, the base station resolves contention for a resource requested by the plurality of UEs in one competition and transmits contention resolution information (S1040). In addition, the base station and the UE exchange control information for network connection and HARQ, thereby transmitting uplink data (S1030).

In a next-generation wireless communication system, V2X communication, an emergency service, and machine control for an ultra-low latency service (ULLS) are taken into consideration. The ULLS has very limited end-to-end (E2E) latency requirements and requires a high data rate, for example, E2E latency <1 ms, a DL data rate of 50 Mbps, and a UL data rate of 25 Mbps. Generally, E2E latency is determined by a network delay, a processing delay, and an air interface delay. An existing contention-based multiple access scheme requires heavy controlling, as shown in FIG. 10, and thus has a long air interface delay. Accordingly, a multiple access method for simplifying a control procedure and efficiently resolving contention for the ULLS and for increasing a data transmission speed is required.

In a next-generation 5G system, a wireless sensor network (WSN) and massive machine-type communication (MTC) that intermittently transmit small packets are taken into consideration for massive connection/low-cost/low-power services. A massive MTC service has very limited connection density requirements but unrestricted data rate and E2E latency requirements (the V2X communication, emergency service, and machine control for the ULLS have a connection density of up to 200,000/km2, E2E latency in seconds to hours, a DL/UL data rate of typically 1 to 100 kbps). Generally, connection density is determined based on the number of supportable UEs. In an existing connection-based multiple access scheme, as shown in FIG. 10, since an eNB controls a connection in multiple access by distinguishing a PRACH of a UE, it is impossible to satisfy the requirements of massive MTC. Further, massive MTC is insensitive to a delay and mainly transmits a sporadic packet having a small a data mount. However, the existing contention-based multiple access scheme has a large amount of control information that needs to be exchanged compared to the quantity of transmission packets. Therefore, a multiple access method for simplifying a control procedure/overhead for transmission and reception of massive connection/low-cost/low-power sporadic packets and for controlling multiple access is required.

The present specification proposes a method of configuring/reconfiguring a physical resource region in which contention occurs (contention zone) in contention-based data transmission (CB transmission) and a method of recognizing a contention zone of a UE and performing transmission. In the present specification, for convenience of description, it is assumed that a contention zone is periodically allocated. However, it is apparent that the same operation may be performed even though aperiodic information is additionally signaled.

Figure 11:
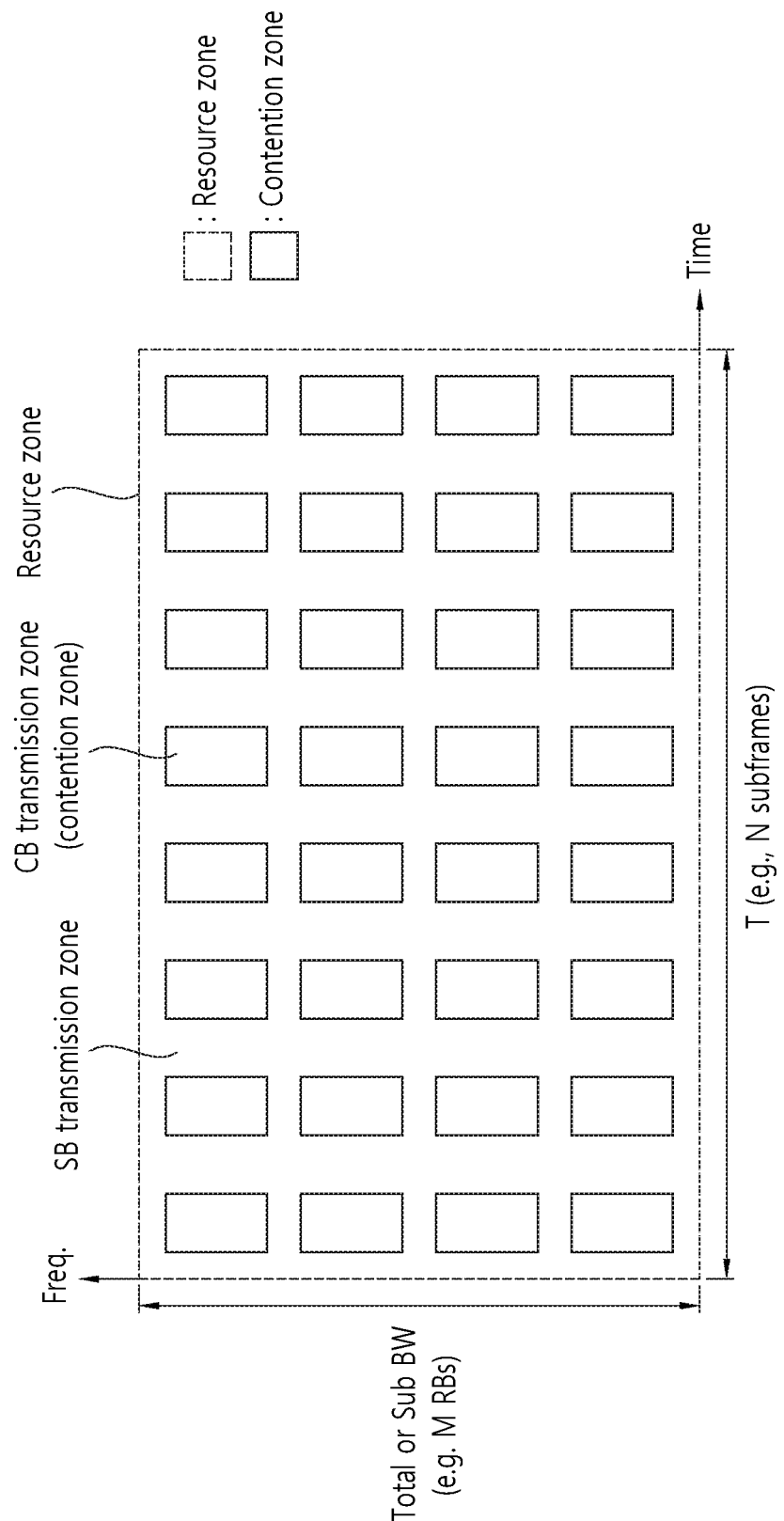
FIG. 11 illustrates an example of a resource zone and a contention zone according to an embodiment of the present specification.

FIG. 11 illustrates an example of a resource zone and a contention zone according to an embodiment of the present specification.

1. Definition of Resource Zone and Contention Zone

Resource zone: Physical resource region including the entire bandwidth or part of the bandwidth within a specified period in which scheduling-based data transmission (SB transmission) and CB transmission are performed.

Contention zone: Minimum physical resource region in which CB transmission is performed.

2. Configuration of Contention Zone

When a UE performs initial access, the UE is allocated a UE-specific contention zone through RRC signaling or an upper-layer signal. Further, as a system environment changes periodically, the UE may be reallocated the UE-specific contention zone via RRC signaling or an upper-layer signal. In this case, from the perspective of the UE, the UE-specific contention zone is merely a physical resource region allocated for CB transmission, and it is not guaranteed that the same physical resource region is not allocated to other users. That is, from the perspective of the overall system, the UE-specific contention zone is a physical resource region that can be shared by a plurality of users, and a base station performs allocation for sharing by a plurality of users. That is, the UE-specific contention zone is a physical resource region in which the UE can perform CB transmission.

The UE-specific contention zone is repeated based on a period T, and the period T may vary depending on the system environment based on a default value x. When the system environment changes, the period T may be transmitted through broadcasting, such as system information broadcasting (SIB). Here, SIB is equivalent to SIB information of legacy LTE and may include all kinds of information (e.g., common DCI) that can be simultaneously received by a plurality of users in a single cell.

2.1. Allocation of Contention Zone Via Configuration Field

A UE may be allocated a UE-specific content zone through RRC signaling or an upper-layer signal. In this case, the location of a physical resource of the contention zone within a resource zone may be recognized via a configuration field. For example, when the contention zone has a uniform configuration in the resource zone, the location and the number of contention zones may be recognized using the density, time domain offset, frequency domain offset, and frequency hopping information of the contention zones in the resource zone. The location and the number of contention zones can be recognized based on frequency hopping information.

Density of contention zone: w bits

Analysis method: density level a of a, contention zone period in time domain of $T/(2^{\wedge}(a))$ There are $2^{\wedge}(a)$ contention zones in one resource zone, and the period between the $2^{\wedge}(a)$ contention zones is $T/(2^{\wedge}(a))$.

Time domain offset of contention zone: x bits

Analysis method: time offset b of $(b)*N/C\_SF+1$

A contention zone is offset by $(b)*N/C\_SF+1$ in the time domain in one resource zone.

N denotes the total number of subframes within the period T.

C_SF denotes the number of contention zones existing in the time domain within one resource zone. In FIG. 11, C_SF=8.

Frequency domain offset of contention zone: y bits

Analysis method: frequency offset c of (c)*M/C_RB+1

A contention zone is offset by (c)*M/C_RB+1 in the frequency domain in one resource zone.

M denotes the total number of PRBs in the entire BW or part of the BW.

C_RB denotes the number of contention zones existing in the time domain within one resource zone. In FIG. 11, C_RB=4.

Frequency hopping of contention zone: z bits

Analysis method: frequency hopping d of (d)*M/C_RB where a zone index is an even number Configuration field: [Density Index, Time Offset Index, Frequency Offset Index, Frequency Hopping Index]=w+x+y+z bits Each index in the configuration field includes 0 to 2^(bits)-1.

N, M, C_SF, and C_RB may be indicated to all users through broadcasting information, such as SIB information, or may be indicated through RRC signaling or an upper-layer signal.

For example, as illustrated below, when there are 32 contention zones in one resource zone where starting subframe index=1 and starting PRB index=1, a seven-bit configuration field may be defined (configuration field of seven bits=[2 bits, 1 bit, 2 bits, 2 bits]). In the following example, C_F=8 and C_RB=4.

Figure 12:
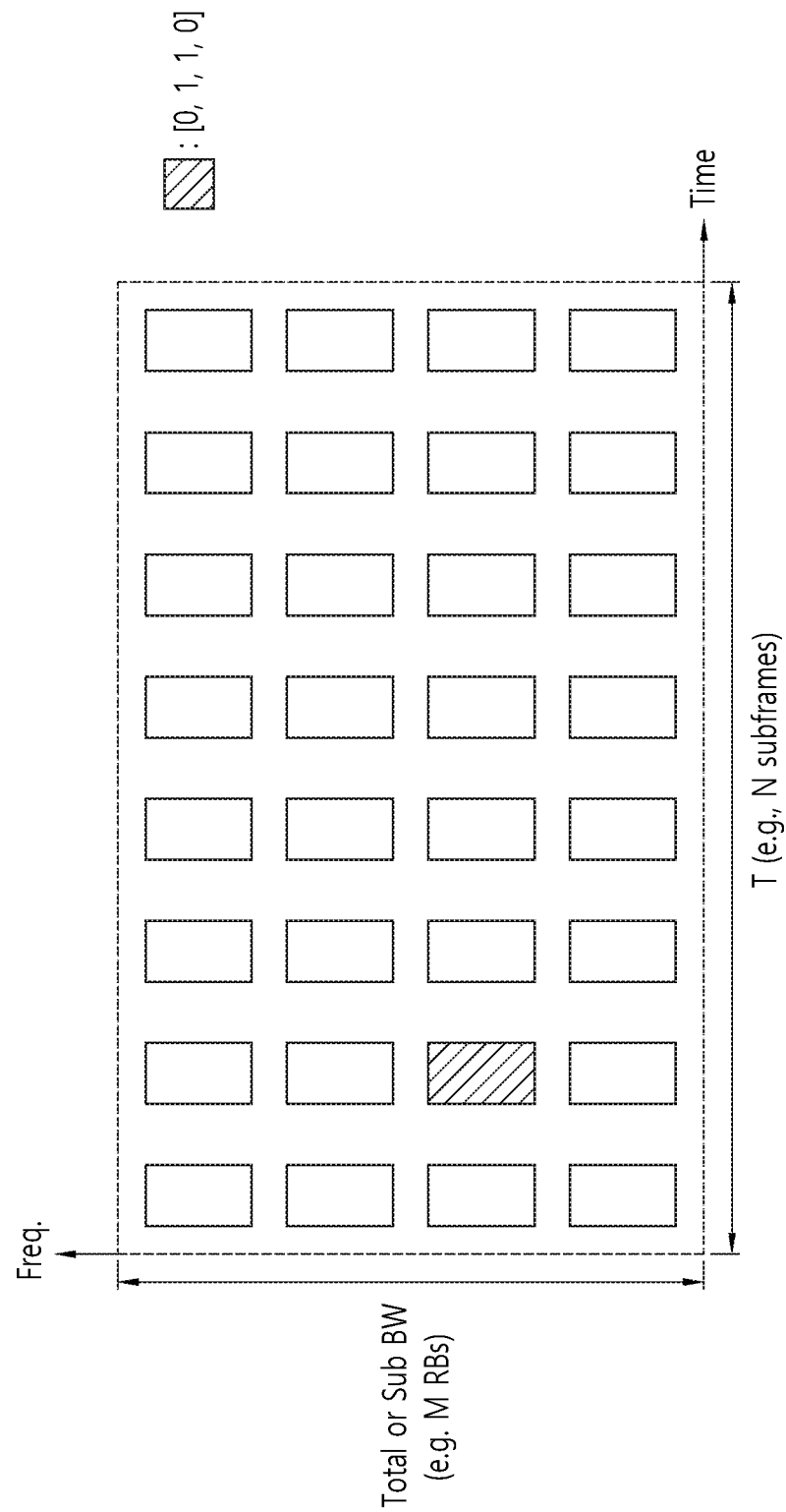
FIG. 12 illustrates an example in which a contention zone is indicated by a configuration field according to an embodiment of the present specification.

FIG. 12 illustrates an example in which a contention zone is indicated by a configuration field according to an embodiment of the present specification.

Referring to FIG. 12, the configuration field=[0, 1, 1, 0]. That is, a density level of 0 indicates that one contention zone exists in one resource zone, a time offset of 1 indicates that the contention zone is located in a subframe 1*N/C_F+1, and a frequency offset of 1 indicates that the contention zone is located in PRB 1*M/C_RB+1.

Likewise, the following example may also be illustrated.

Figure 13:
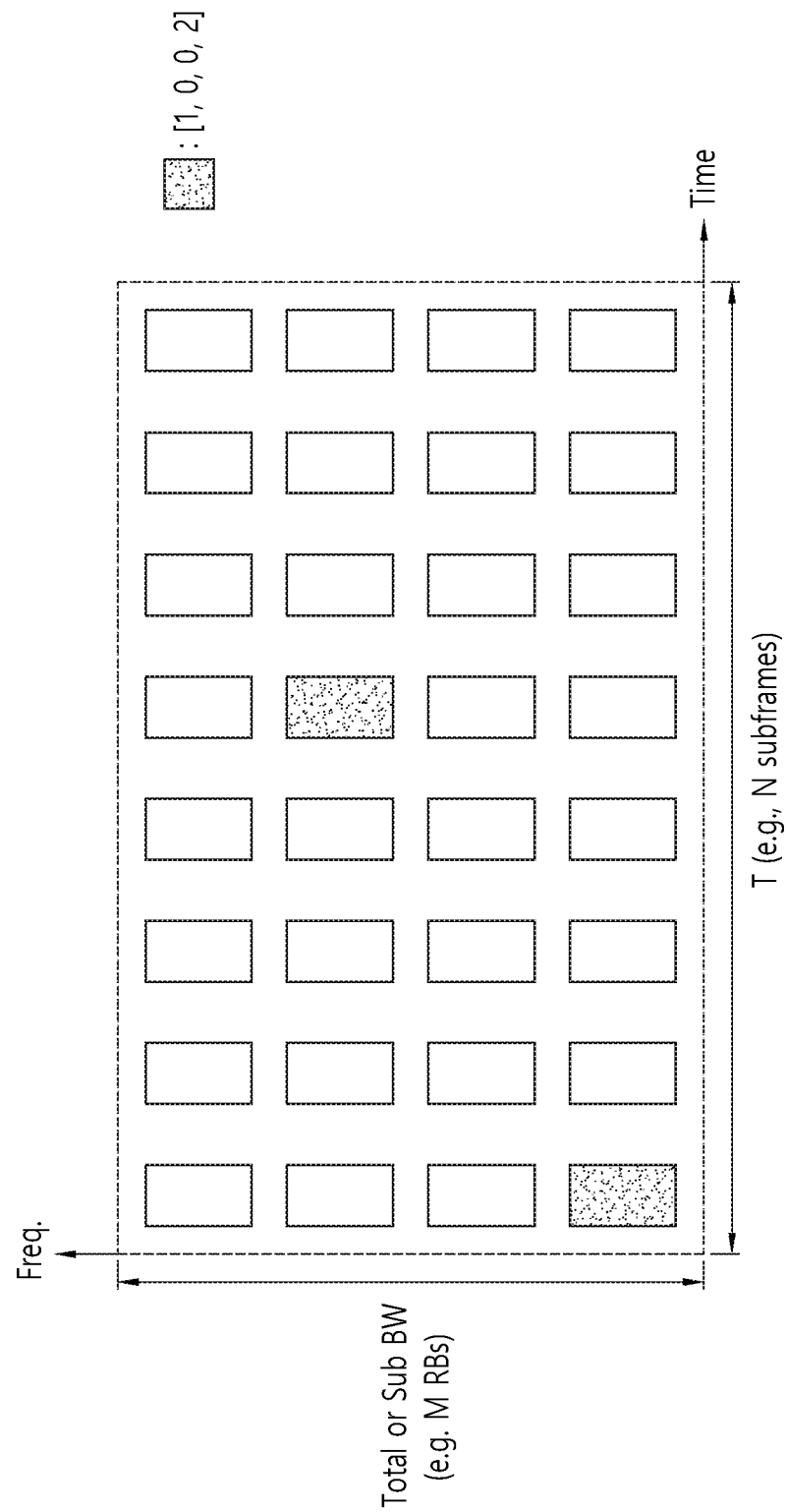
FIG. 13 illustrates an example in which a contention zone is indicated by a configuration field according to another embodiment of the present specification.

FIG. 13 illustrates an example in which a contention zone is indicated by a configuration field according to another embodiment of the present specification.

Referring to FIG. 13, the configuration field=[1, 0, 0, 2]. That is, a density level of 1 indicates that two contention zones exist in one resource zone, where the period thereof is T/2. Contention zone 1 of the two contention zones has a time offset of 0, thus being located in subframe 1, and has a frequency offset of 0, thus being located in PRB 1. Contention zone 2 of the two contention zones has a time offset of 0, thus being located in subframe 1+T/2. Since contention zone 2 has a frequency offset of 0 and frequency hopping is 2 with respect to PRB 1, frequency hopping of 2*M/C_RB is performed on contention zone 2. That is, it is analyzed that a PRB index of 2*M/C_RB+1 is allocated through hopping a PRB having an index of 1 by 2*M/C_RB.

Likewise, the following example may also be illustrated.

Figure 14:
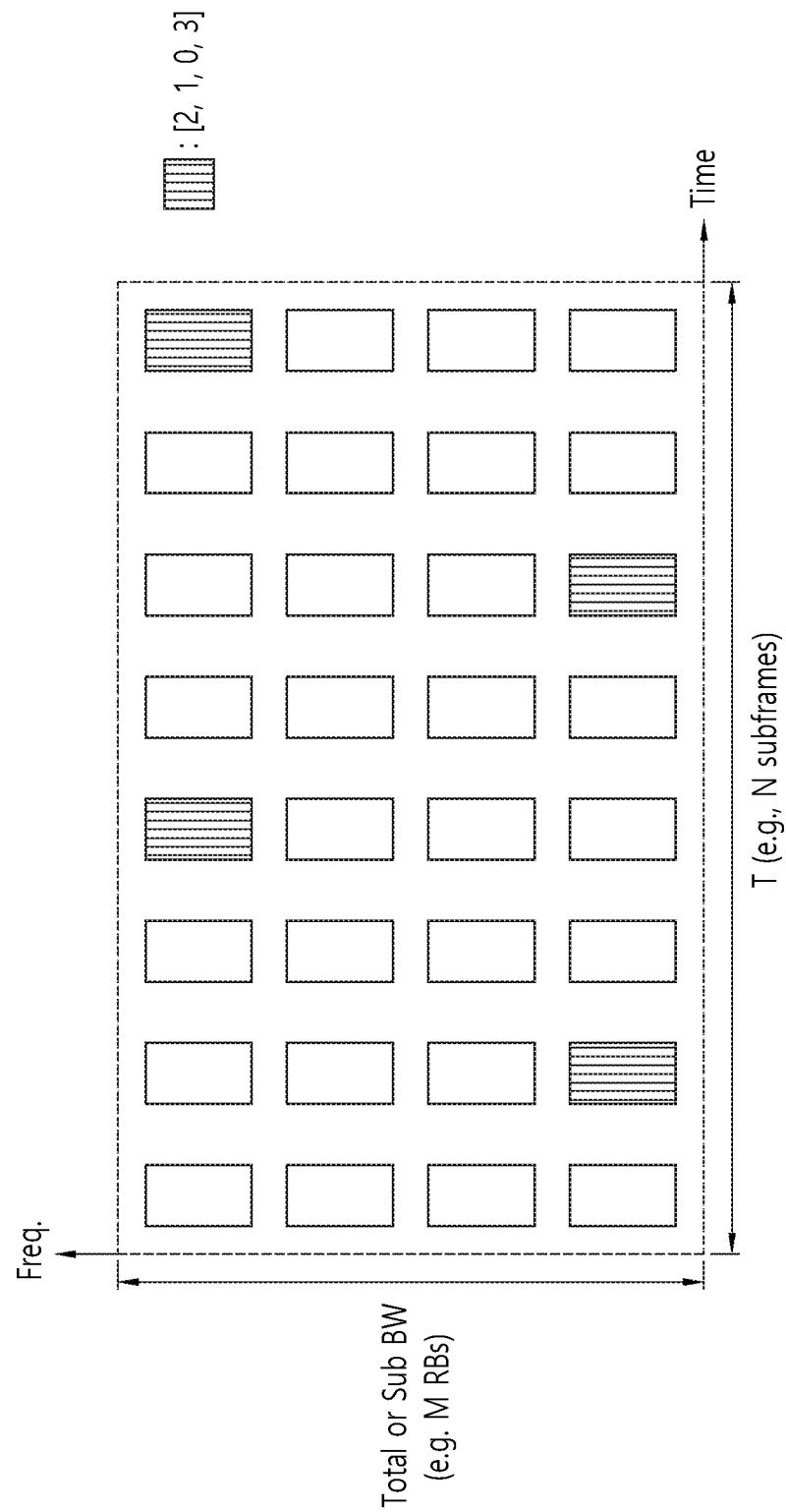
FIG. 14 illustrates an example in which a contention zone is indicated by a configuration field according to still another embodiment of the present specification.

FIG. 14 illustrates an example in which a contention zone is indicated by a configuration field according to still another embodiment of the present specification.

Referring to FIG. 14, the configuration field=[2, 1, 0, 3]. That is, a density level of 2 indicates that four contention zones exist in one resource zone, where the period thereof is T/4. Contention zone 1 of the four contention zones has a time offset of 1, thus being located in subframe 1*N/C_SF+1, and has a frequency offset of 0, thus being located in PRB 1.

Contention zone 2 of the four contention zones has a time offset of 1 and thus is located in subframe 1*N/C_SF+1+T/4. Since contention zone 2 has a frequency offset of 0 and frequency hopping is 3 with respect to PRB 1, frequency hopping of 3*M/C_RB is performed on contention zone 2. That is, it is analyzed that a PRB index of 3*M/C_RB+1 is allocated through hopping a PRB having an index of 1 by 3*M/C_RB.

Contention zone 3 of the four contention zones has a time offset of 1 and thus is located in subframe 1*N/C_SF+1+T/4*2. Contention zone 3 is not subjected to frequency hopping and has a frequency offset of 0, thus being located in PRB 1.

Contention zone 4 of the four contention zones has a time offset of 1 and thus is located in subframe 1*N/C_SF+1+T/4*3. Since contention zone 4 has a frequency offset of 0 and frequency hopping is 3 with respect to PRB 1, frequency hopping of 3*M/C_RB is performed on contention zone 2. That is, it is analyzed that a PRB index of 3*M/C_RB+1 is allocated through hopping a PRB having an index of 1 by 3*M/C_RB.

Figure 15:
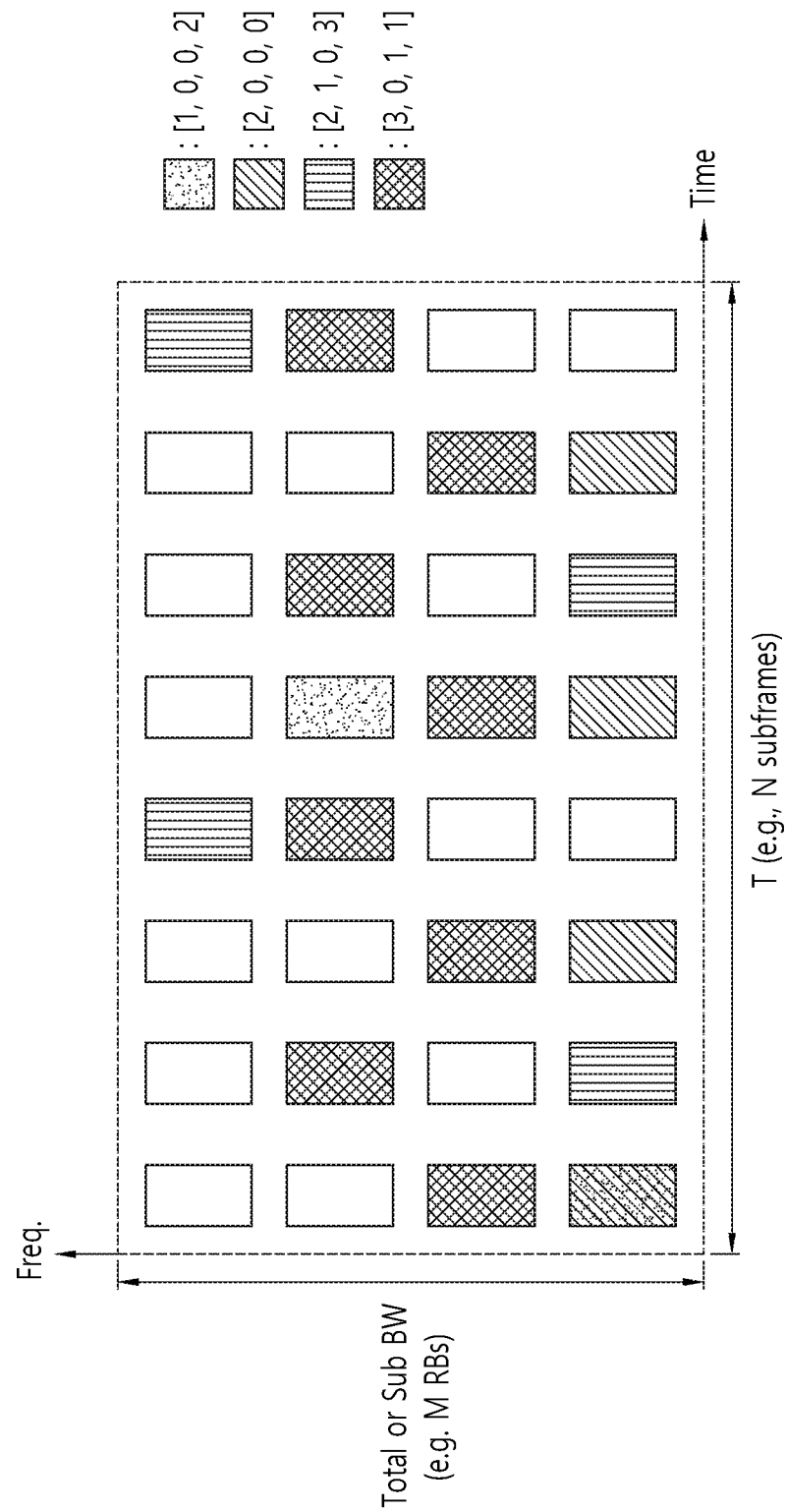
FIG. 15 illustrates an example in which a contention zone is variously indicated according to the number of bits of a configuration field according to an embodiment of the present specification.

FIG. 15 illustrates an example in which a contention zone is variously indicated according to the number of bits of a configuration field according to an embodiment of the present specification.

This method may specify 2^7 configurations through a seven-bit configuration field. It is obvious that the 2^7 configurations may overlap from the perspective of the entire system. That is, as illustrated in FIG. 15, contention zone may overlap.

2.2. Allocation of Contention Zone Through Pattern Index Field

It is possible to indicate a physical resource region of a contention zone via a lookup table by predefining a pattern of contention zones in a resource zone. In this case, a lookup table of various patterns in one resource zone needs to be predefined and stored in advance in a transmitter and a receiver. For example, the following table may be defined.

TABLE 3

| Pattern Index | Location of Contention Zones |
|---|---|
| 1 | Contention Zone 1: PRB Index = 1, Subframe Index = 1 |
| 2 | Contention Zone 1: PRB Index = 3, Subframe Index = 1 |
| 3 | Contention Zone 1: PRB Index = 1, Subframe Index = 5 |
| 4 | Contention Zone 1: PRB Index = 1, Subframe Index = 1 |
|   | Contention Zone 2: PRB Index = 3, Subframe Index = 5 |
| 5 | Contention Zone 1: PRB Index = 1, Subframe Index = 5 |
|   | Contention Zone 2: PRB Index = 3, Subframe Index = 1 |
| ... | ... |

Referring to the table, a configuration method needs to be used, instead of random selection, for all contention zones in one resource zone, because blind detection (BD) cannot be performed when repetition is considered. Further, in the worst user access case (when all users are gathered in one contention zone), the configuration method is more appropriate since there is a difference in the degree of the worst collision between fully random selection and the configuration method. A base station of a system operating based on section 2.1 and section 2.2 needs to always perform BD for an allocated UE-specific contention zone.

3. Repetition Triggering 3.1. Repetition Triggering by gNB

When each UE is allocated a UE-specific contention zone according to the method proposed in section 2, if the density level is 1 or greater, two or more contention zones may be allocated. Here, a repetition triggering field is indicated through an RRC or upper-layer signal according to the UE class. For example, when the repetition triggering field is configured with one-bit information, the repetition triggering field indicates whether repetition is performed in a plurality of contention zones.

Repetition triggering OFF: [0]

Analysis method: One contention zone is randomly selected from a contention zone set allocated by a base station in one resource zone, and CB transmission is performed in the selected contention zone. When performing BD, the base station performs BD assuming that one of all UE-specific contention zones for a UE is randomly selected.

Repetition triggering ON: [1]

Analysis method: CB transmission is performed in a repetition manner in all contention zones in a contention zone set allocated by the base station in one resource zone. That is, the same data packet is repeatedly transmitted in all contention zones. When performing BD, the base station performs BD based on combining assuming that repetition is performed using all UE-specific contention zones for the UE.

When the UE performs initial access, such as an RRC connection, the base station may estimate the coverage class of the UE based on DL measurement information or UL reference signal (RS) information of the UE and may distinguish the UE class. Accordingly, repetition triggering ON may be indicated to a user requiring the proposed repetition, thereby increasing the CB transmission coverage of the UE.

3.2. Repetition Triggering by UE

Unlike the method illustrated in section 3.1, repetition triggering may be selected by a UE itself. A base station does not transmit a repetition triggering field, and the UE directly determines whether repetition is necessary for a UL based on a specified SNR threshold value through DL measurement information. When it is determined that repetition is necessary, CB transmission is performed in a repeated manner in all contention zones in a contention zone set allocated by the base station in one resource zone. On the contrary, when it is determined that repetition is not necessary, one contention zone is randomly selected from a contention zone set allocated by the base station in one resource zone, and CB transmission is performed in the selected contention zone. When performing BD, the base station performs BD in each case assuming that one of all UE-specific contention zones for the UE is randomly selected or that repetition is performed using all the UE-specific contention zones for the UE.

Figure 16:
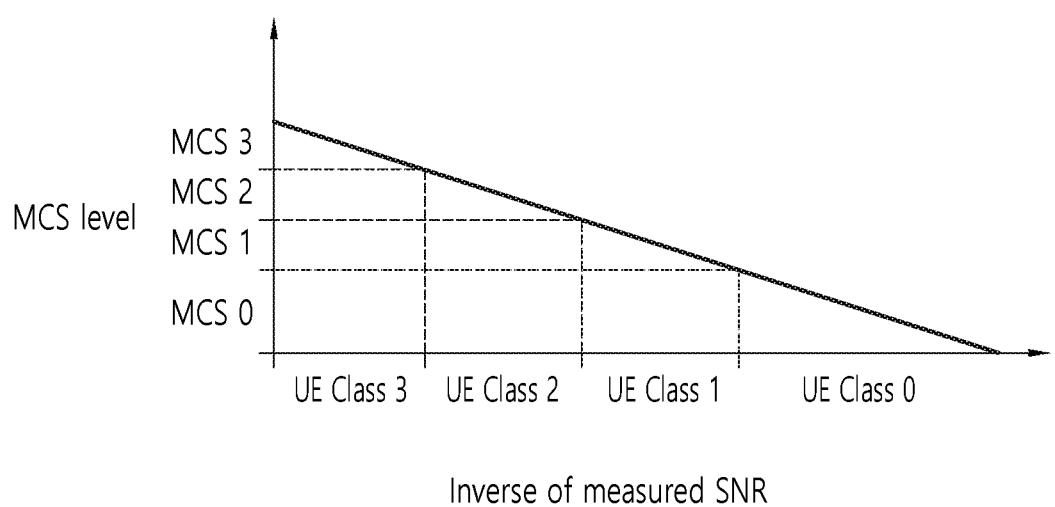
FIG. 16 is a graph illustrating the relationship between an MCS level and a UE class based on a measured SNR according to an embodiment of the present specification.

FIG. 16 is a graph illustrating the relationship between an MCS level and a UE class based on a measured SNR according to an embodiment of the present specification.

4. Link adaptation for CB Transmission

A UE may be allocated a UE-specific content zone through RRC signaling or an upper-layer signal. In this case, the location of a physical resource of the contention zone for each MCS level within a resource zone may be recognized via a configuration field for each MCS level. The method of operating the configuration field for each MCS level may be interpreted as being equivalent or similar to the method described in section 2.

For example, it is assumed that four MCS levels from 0 to 3 are available for CB transmission. Further, it is assumed that the UE class of each UE may be determined based on UE class selection based on a DL measurement of the UE or based on UE class allocation by a base station based on a UL RS. Then, a UE class and an MCS level may be connected as illustrated in FIG. 16.

Although FIG. 16 shows a connection with an MCS level based on a measured SNR, it is possible to connect a UE class and an MCS level for CB transmission according to various methods, such as attainable spectral efficiency and multi-user scheduling according to multiple access (MA).

<UE Behavior>

The UE receives a UE class selected based on a DL measurement or a UE class allocated by a base station based on a UL RS via control signaling.

The UE recognizes a pool of MCS levels available based on the UE class.

When CB transmission is performed due to the generation of traffic, if the generated traffic has a size equal to or greater than a transport block size (TBS) associated with the maximum MCS level in the pool of the available MCS levels, the UE selects the maximum MCS level from the pool of the MCS levels and performs CB transmission in a contention zone associated with the MCS level.

When CB transmission is performed due to the generation of traffic, if the generated traffic has a size that is less than the TBS associated with the maximum MCS level in the pool of the available MCS levels and is equal to or greater than a TBS associated with the second largest MCS level, the UE selects the second largest MCS level from the pool of the MCS levels and performs CB transmission in a contention zone associated with the MCS level.

When CB transmission is performed due to the generation of traffic, if the generated traffic has a size that is less than a TBS associated with the nth largest MCS level in the pool of the available MCS levels and is equal to or greater than a TBS associated with the n+1th largest MCS level, the UE selects the n+1th largest MCS level from the pool of the MCS levels and performs CB transmission in a contention zone associated with the MCS level.

When CB transmission is performed due to the generation of traffic, if the generated traffic has a size that is less than a TBS associated with the minimum MCS level in the pool of the available MCS levels, the UE selects the minimum MCS level and performs CB transmission in a contention zone associated with the MCS level.

In this case, repetition triggering may be performed.

In this method, repetition triggering illustrated in section 3 is valid only in the contention zone associated with the minimum MCS Level. That is, repetition may or may not be used in the minimum MCS level. Further, when the number of contention zones associated with an MCS level greater than the minimum MCS level exceeds one, a default operation may be performed in a random selection mode (repetition triggering OFF), because repetition may not be required in a case other than the minimum MCS level. In the presence of a repetition triggering field (case in section 3.1), the UE operates by analyzing only the contention zone associated with the minimum MCS level. When the UE selects repetition triggering (case in section 3.2), the UE operates only in the contention zone associated with the minimum MCS level.

In the above method, repetition triggering illustrated in section 3 is valid in all contention zones configured for the UE. That is, repetition may or may not be used in the minimum MCS level. Further, even in an MCS level exceeding the minimum MCS level, repetition may or may not be used depending on whether a repetition triggering field is interpreted (case in section 3.1) or the UE selects repetition (case in section 3.2).

Figure 17:
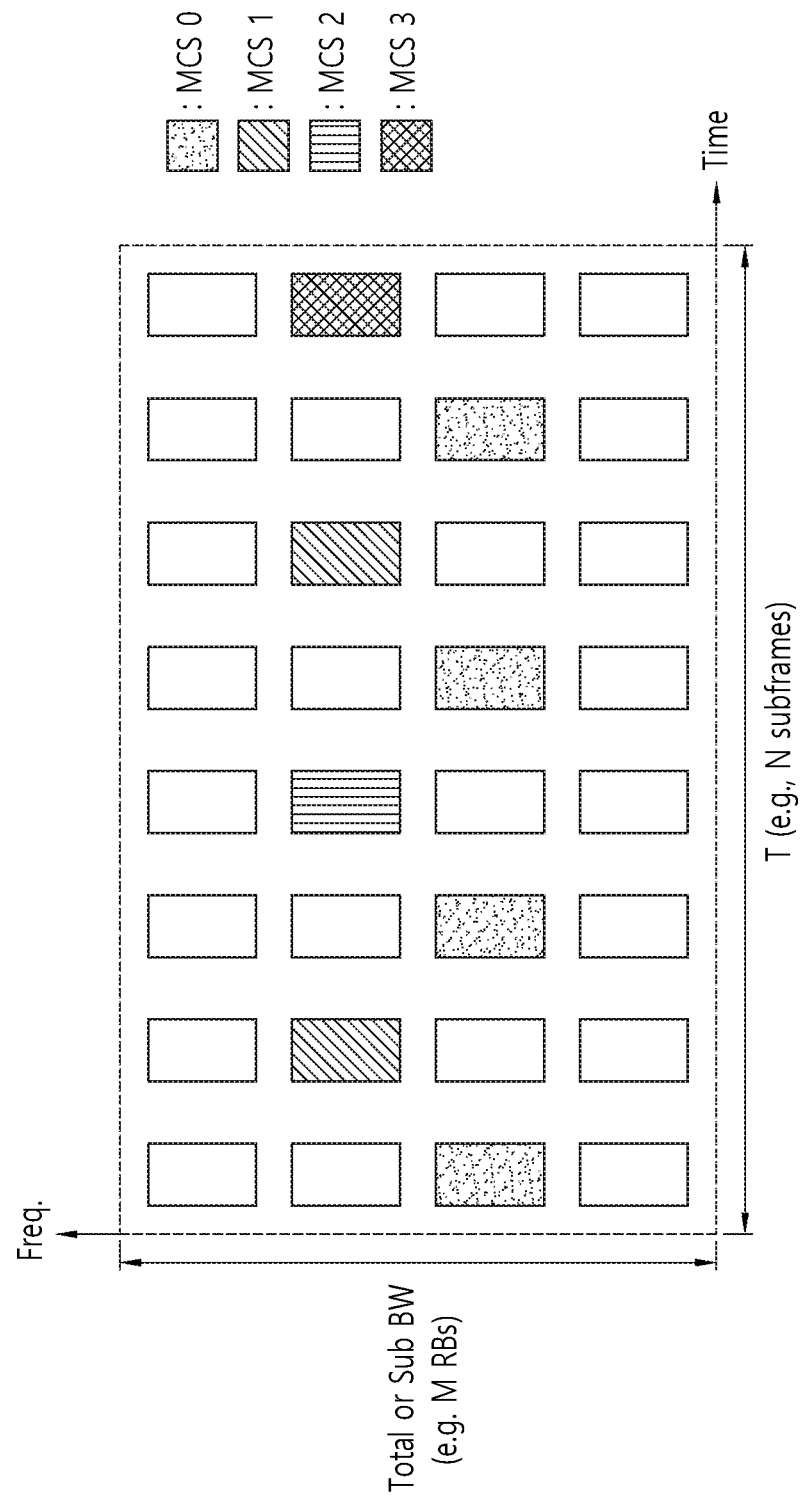
FIG. 17 illustrates an example in which a contention zone is indicated according to an MCS level according to an embodiment of the present specification.

FIG. 17 illustrates an example in which a contention zone is indicated according to an MCS level according to an embodiment of the present specification.

A contention zone may be configured according to an MCS level as illustrated in FIG. 17.

Referring to FIG. 17, MCS 0 is configured as [2, 0, 1, 0] based on the configuration method illustrated in section 2. Since a density level is 2, four contention zones exist in one resource block. The contention zones are shown according to a time offset, a frequency offset, and frequency hopping as in FIG. 17. Since MCS 0 is the minimum MCS level, it is determined whether repetition is performed by a repetition triggering field (or by a UE's selection).

MCS 1 is configured as [1, 1, 2, 0] based on the configuration method illustrated in section 2. Since a density level is 1, two contention zones exist in one resource block. The contention zones are shown according to a time offset, a frequency offset, and frequency hopping as in FIG. 17. Since MCS 1 is not the minimum MCS level, an operation is performed according to repetition triggering OFF, which is a default mode, and accordingly one of the two contention zones is randomly selected to perform CB transmission.

Based on the configuration method illustrated in section 2, MCS 2 may be configured as [0, 3, 2, 0], and MCS 3 may be configured as [0, 7, 2, 0].

In the above methods, the maximum MCS level available for each UE varies, and thus a set of contention zones for each MCS level configured for each user may vary. Alternatively, the same MCS level is available for all UEs, and thus all contention zones for all MCS levels may be configured.

Figure 18:
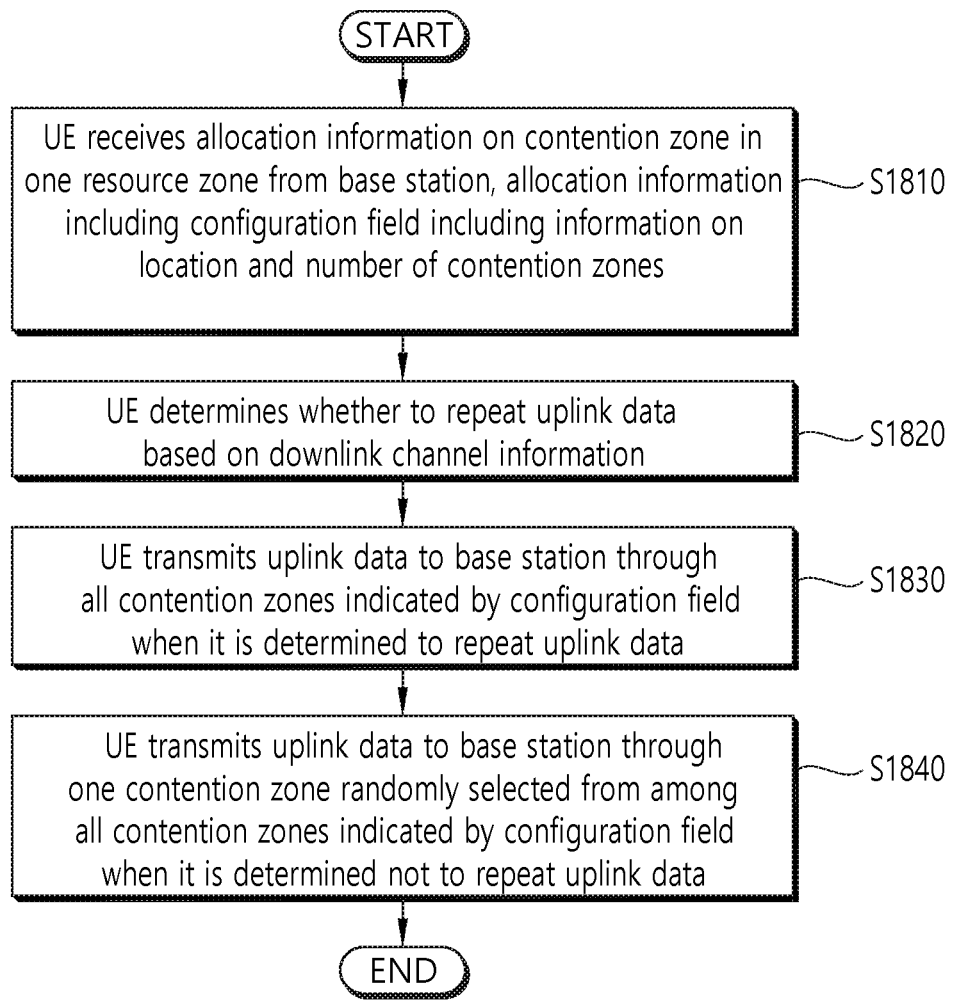
FIG. 18 is a flowchart illustrating a procedure for transmitting uplink data based on contention according to an embodiment of the present specification.

FIG. 18 is a flowchart illustrating a procedure for transmitting uplink data based on contention according to an embodiment of the present specification.

This embodiment illustrates grant-free uplink communication between a base station and a particular UE in a wireless communication system to which an orthogonal or non-orthogonal multiple access scheme is applied. In grant-free uplink data transmission, since an uplink grant (UL grant) for data transmission is not received, the UE may select a resource for data transmission from among contention resources to perform data transmission.

First, terms used herein are defined. A contention zone may correspond to a resource region for contention-based uplink connection or uplink data transmission based on orthogonal or non-orthogonal multiple access. That is, a contention zone may correspond to a minimum-unit physical resource region in which contention-based transmission is performed. In contrast, a resource zone is a physical resource region in which scheduling-based transmission and contention-based transmission are performed and may correspond to a resource region using all or part of bandwidth within a specific period.

In operation S1810, a UE receives allocation information on a contention zone in one resource zone from a base station. The allocation information includes a configuration field including information on the location of a contention zone and the number of contention zones.

When the contention zone is indicated by the configuration field, the configuration field may be configured as follows.

For example, the configuration field may include a density index, a time offset index, a frequency offset index, and a frequency hopping index. The density index may include information on the number of contention zones allocated in the one resource zone and a period between the contention zones allocated in the one resource zone. The time offset index may include information on a position at which the contention zone allocated in the one resource zone is time-offset from a reference subframe. The frequency offset index may include information on a position at which the contention zone allocated in the one resource zone is frequency-offset from a reference resource block. The frequency hopping index may include information on a frequency hopping interval between the contention zones allocated in the one resource zone.

When the contention zone is indicated by a pattern index for a predefined allocation pattern, the configuration field may not be used. That is, the allocation information may further include a pattern index including information on a predefined allocation pattern of the contention zone in the one resource zone. The predefined allocation pattern may be defined in the format of a lookup table. This format has a disadvantage of imposing heavy loads on a memory because all predefined allocation patterns need to be stored in the memory, but has an advantage of enabling quick performance processing because it is not necessary to perform calculation due to a value included in the configuration field.

The allocation information may be received through radio resource control (RRC) signaling or an upper-layer signal.

The contention zone in the one resource zone may be periodically allocated based on a period T. The period T may be broadcast through system information broadcasting (SIB).

The maximum number of subframes in which the contention zone in the one resource is allocated and the maximum number of resource blocks in which the contention zone in the one resource is allocated may be received through RRC signaling or an upper-layer signal or may be broadcasted through SIB.

The number of bits of the configuration field may be determined according to the maximum number of subframes in which the contention zone in the one resource is allocated and the maximum number of resource blocks in which the contention zone in the one resource is allocated. For example, when the maximum number of subframes is eight and the maximum number of resource blocks is four, there may be 32 contention zones in one resource. Accordingly, a combination of contention zones in one resource may be indicated by a configuration field of seven bits (2^7).

In operation S1820, the UE may determine whether to repeat uplink data based on downlink channel information. The UE may measure a signal-to-noise ratio (SNR) through the downlink channel information.

When the UE is located at the cell edge or is a low-cost massive machine-type communication (MMTC) UE, it is necessary to repeatedly use small power due to a small power amp. Accordingly, the UE may determine whether to repeat the uplink data based on whether the SNR measured through the downlink channel information exceeds a specified threshold value.

In operation S1830, when it is determined to repeat the uplink data, the UE transmits the uplink data to the base station through all contention zones indicated by the configuration field.

In operation S1840, when it is determined not to repeat the uplink data, the UE transmits the uplink data to the base station through one contention zone randomly selected from among all contention zones indicated by the configuration field.

Unlike retransmission of uplink data, repetition of uplink data may be a method of performing one transmission through all contention zones indicated by the configuration field. Therefore, repetition of uplink data corresponds to one transmission through a plurality of contention zones regardless of whether transmission of uplink data fails. When the base station transmits a response signal including information on that transmission of uplink data has failed and thus the UE performs second transmission, the second transmission may be retransmission of the uplink data.

The UE may consider link adaptation for contention-based transmission.

The UE may select a UE class based on the downlink channel information.

The UE may determine a modulation and coding scheme (MCS) level candidate that is available based on the UE class.

In this case, the UE class may be associated with the MCS level candidate based on the measured SNR. The UE class may correspond to a UE group considering a location in a cell. Therefore, a UE group located at the cell edge has a low SNR and may thus use a low MCS level, while a UE group located at the cell center has a high SNR and may thus use various MCS levels. The UE may select an appropriate MCS level from among maximum MCS levels in consideration of generated traffic.

The configuration field may further indicate the location of a contention zone and the number of contention zones for each MCS level included in the MCS level candidate. When the uplink data is repeated, the uplink data may be transmitted through a contention zone for a minimum MCS level among all the contention zones indicated by the configuration field.

Figure 19:
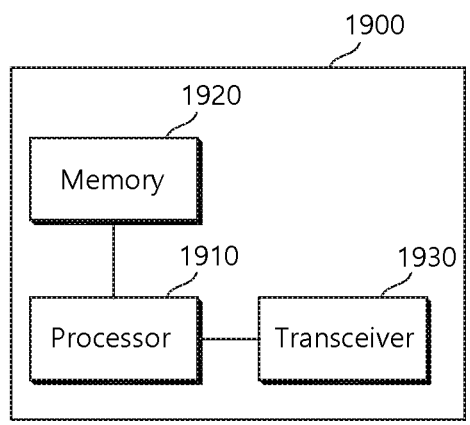
FIG. 19 is a block diagram showing an apparatus for wireless communication for implementing an embodiment of the present specification.

FIG. 19 is a block diagram showing a wireless device to which an exemplary embodiment of this specification can be applied.

Referring to FIG. 19, as a station (STA) that can implement the above-described exemplary embodiment, the wireless device may operate as an AP or a non-AP STA. Additionally, the wireless device may correspond to a user, or the user may correspond to a transmitting device transmitting a signal to the receiving device.

As shown in the drawing, the wireless device of FIG. 19 includes a processor (1910), a memory (1920), and a transceiver (1930). Each of the processor (1910), memory (1920), and transceiver (1930) shown in FIG. 19 may be implemented as a separate chip, or at least two or more blocks/functions may be implemented through a single chip.

The transceiver (1930) is a device including a transmitter and a receiver, and when a specific operation is performed, the transceiver (1930) may perform the operations of any one of the transmitter and the receiver, or the transceiver may perform the operations of both the transmitter and the receiver. The transceiver (1930) may include one or more antennas transmitting and/or receiving radio signals. Additionally, the transceiver (1930) may include an amplifier for amplifying a reception signal and/or a transmission signal and a band-pass filter for performing transmission over a specific frequency band.

The processor (1910) may implement functions, processes, and/or methods proposed in this specification. For example, the processor (1910) may perform operations according to the above0 described exemplary embodiment of this specification. More specifically, the processor (1910) may perform the operations disclosed in the exemplary embodiment shown in FIG. 1 to FIG. 18.

The processor (1910) may include an application-specific integrated circuit (ASIC), a separate chipset, a logic circuit, a data processing unit, and/or a converter inter-converting baseband signals and radio signals. The memory (1920) may include a read-only memory (ROM), a random access memory (RAM), a flash memory, a memory card, a storage medium, and/or other equivalent storage devices.

Figure 20:
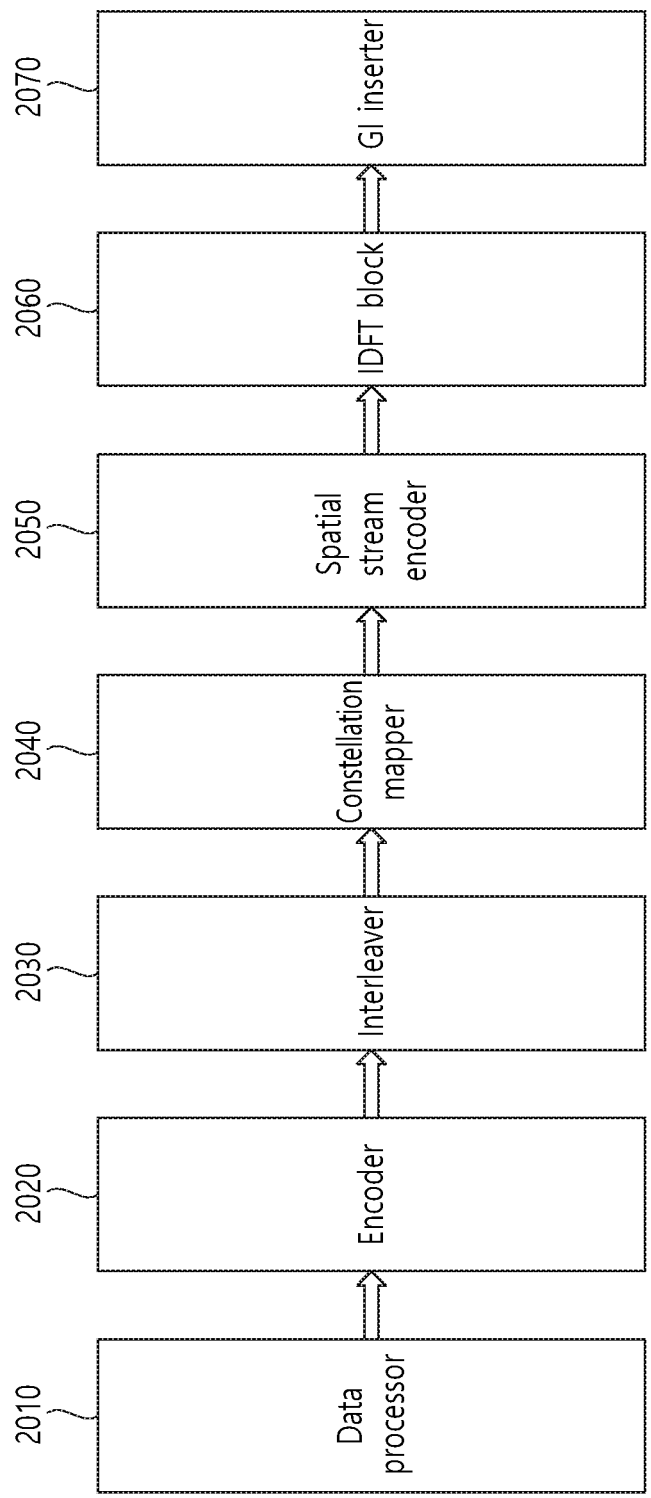
FIG. 20 is a block diagram showing an example of a device being included in a processor.

FIG. 20 is a block diagram showing an example of a device being included in a processor. For simplicity in the description, although an example of FIG. 20 is described based on a block for a transmission signal, it will be apparent that a reception signal may be processed by using the corresponding block.

A data processing unit (2010) shown in FIG. 20 generates transmission data (control data and/or user data) corresponding to a transmission signal. An output of the data processing unit (2010) may be inputted to an encoder (2020). The encoder (2020) may perform coding by using binary convolutional code (BCC) or low-density parity-check (LDPC) coding schemes. At least one encoder (2020) may be included herein, and the number of encoders (2020) may be determined based on diverse information (e.g., number of data streams).

An output of the encoder (2020) may be inputted to an interleaver (2030). The interleaver (2030) may perform operations of distributing consecutive bit signals within a radio resource (e.g., time and/or frequency) in order to prevent any burst error, which is caused by fading, and so on. At least one interleaver (2030) may be included herein, and the number of interleavers (2030) may be determined based on diverse information (e.g., number of spatial streams).

An output of the interleaver (2030) may be inputted to a constellation mapper (2040). The constellation mapper (2040) may perform constellation mapping, such as biphase shift keying (BPSK), Quadrature Phase Shift Keying (QPSK), n-quadrature amplitude modulation (QAM), and so on.

An output of the constellation mapper (2040) may be inputted to a spatial stream encoder (2050). The spatial stream encoder (2050) performs data processing in order to transmit a transmission signal via at least one spatial stream. For example, the spatial stream encoder (2050) may perform at least one of space-time block coding (STBC), Cyclic shift diversity (CSD) insertion, and spatial mapping on the transmission signal.

An output of the spatial stream encoder (2050 may be inputted to an IDFT (2060) block. The IDFT (2060) block may perform inverse discrete Fourier transform (IDFT) or inverse Fast Fourier transform (IFFT).

An output of the IDFT (2060) block is inputted to a Guard Interval (GI) inserter (2070), and an output of the GI inserter (2070) is inputted to the transceiver (2030) of FIG. 19.

What is claimed is:

1. A method for transmitting uplink data based on contention in a wireless communication system, the method comprising:

receiving, by a user equipment (UE) from a base station, allocation information regarding a contention zone in one resource zone, the allocation information comprising a configuration field including information regarding a location and a number of contention zones;

determining, by the UE, whether to repeat uplink data based on downlink channel information;

transmitting, by the UE, the uplink data to the base station through all contention zones indicated by the configuration field based on a determination to repeat the uplink data; and transmitting, by the UE, the uplink data to the base station through one contention zone randomly selected from among all the contention zones indicated by the configuration field based on a determination not to repeat the uplink data, wherein the configuration field comprises a density index, a time offset index, a frequency offset index, and a frequency hopping index, wherein the density index includes information regarding a number of contention zones allocated in the one resource zone and a period between the contention zones allocated in the one resource zone, wherein the time offset index includes information regarding a position at which the contention zone allocated in the one resource zone is time-offset from a reference subframe, wherein the frequency offset index includes information regarding a position at which the contention zone allocated in the one resource zone is frequency-offset from a reference resource block, and wherein the frequency hopping index includes information regarding a frequency hopping interval between the contention zones allocated in the one resource zone.

2. The method of claim 1, wherein the allocation information is received through radio resource control (RRC) signaling or an upper-layer signal.

3. The method of claim 1, wherein the contention zone in the one resource zone is periodically allocated based on a period T, and the period T is broadcast through system information broadcasting (SIB).

4. The method of claim 1, wherein a maximum number of subframes in which the contention zone in the one resource zone is allocated and a maximum number of resource blocks in which the contention zone in the one resource zone is allocated are received through RRC signaling or an upper-layer signal or are broadcasted through SIB.

5. The method of claim 1, wherein the allocation information further comprises a pattern index including information regarding a predefined allocation pattern of the contention zone in the one resource zone.

6. The method of claim 1, further comprising:
selecting, by the UE, a UE class based on the downlink channel information; and
determining, by the UE, a modulation and coding scheme (MCS) level candidate that is available based on the UE class,
wherein the UE class is associated with the MCS level candidate based on a measured SNR,
wherein the configuration field further includes information regarding a location of a contention zone and a number of contention zones for each MCS level comprised in the MCS level candidate, and
wherein the uplink data is transmitted through a contention zone for a minimum MCS level among all the contention zones indicated by the configuration field, based on the uplink data being repeated.

7. A user equipment (UE) for transmitting uplink data based on contention in a wireless communication system, the UE comprising:
a transceiver to transmit and receive a radio signal;
a processor connected to the transceiver,
wherein the processor is configured to:
receive, from a base station, allocation information regarding a contention zone in one resource zone, the allocation information comprising a configuration field including information regarding a location and a number of contention zones;
determine whether to repeat uplink data based on downlink channel information;
transmit the uplink data to the base station through all contention zones indicated by the configuration field based on a determination to repeat the uplink data; and
transmit the uplink data to the base station through one contention zone randomly selected from among all the contention zones indicated by the configuration field based on a determination not to repeat the uplink data,
wherein the configuration field comprises a density index, a time offset index, a frequency offset index, and a frequency hopping index,
wherein the density index includes information regarding a number of contention zones allocated in the one resource zone and a period between the contention zones allocated in the one resource zone,
wherein the time offset index includes information regarding a position at which the contention zone allocated in the one resource zone is time-offset from a reference subframe,
wherein the frequency offset index includes information regarding a position at which the contention zone allocated in the one resource zone is frequency-offset from a reference resource block, and
wherein the frequency hopping index includes information regarding a frequency hopping interval between the contention zones allocated in the one resource zone.

8. The UE of claim 7, wherein the allocation information is received through radio resource control (RRC) signaling or an upper-layer signal.

9. The UE of claim 7, wherein the contention zone in the one resource zone is periodically allocated based on a period T, and the period T is broadcast through system information broadcasting (SIB).

10. The UE of claim 7, wherein a maximum number of subframes in which the contention zone in the one resource zone is allocated and a maximum number of resource blocks in which the contention zone in the one resource zone is allocated are received through RRC signaling or an upper-layer signal or are broadcasted through SIB.

11. The UE of claim 7, wherein the allocation information further comprises a pattern index including information regarding a predefined allocation pattern of the contention zone in the one resource zone.

12. The UE of claim 7, wherein the processor is further configured to select a UE class based on the downlink channel information and determine a modulation and coding scheme (MCS) level candidate that is available based on the UE class,
wherein the UE class is associated with the MCS level candidate based on a measured SNR,
wherein the configuration field further includes information regarding a location of a contention zone and a number of contention zones for each MCS level comprised in the MCS level candidate, and
wherein the uplink data is transmitted through a contention zone for a minimum MCS level among all the contention zones indicated by the configuration field based on the uplink data being repeated.

* * * * *